United States Patent [19]

Nakaniwa et al.

[11] Patent Number: 4,911,132

[45] Date of Patent: Mar. 27, 1990

[54] FUEL INJECTION CONTROL SYSTEM FOR MULTI-CYLINDER INTERNAL COMBUSTION ENGINE WITH FEATURE OF IMPROVED RESPONSE CHARACTERISTICS TO ACCELERATION ENRICHMENT DEMAND

[75] Inventors: Shinpei Nakaniwa; Seiichi Otani; Toru Hamada; Masanobu Osaki; Yukio Hoshino; Naoki Tomisawa, all of Gunma, Japan

[73] Assignee: Japan Electronic Control Systems Company, Limited, Isezaki, Japan

[21] Appl. No.: 252,977

[22] Filed: Oct. 4, 1988

Related U.S. Application Data

[63] Continuation-in-part of Ser. No. 135,364, Dec. 21, 1987.

[30] Foreign Application Priority Data

Dec. 19, 1986 [JP] Japan ............................... 61-301535
Jun. 16, 1987 [JP] Japan ............................... 62-148036
Aug. 31, 1987 [JP] Japan ............................... 62-215189
Oct. 5, 1987 [JP] Japan ............................... 62-249946

[51] Int. Cl.$^4$ ............................................. F02D 41/10
[52] U.S. Cl. ..................................... 123/492; 123/478
[58] Field of Search ................ 123/478, 480, 490, 492

[56] References Cited

U.S. PATENT DOCUMENTS

| 4,408,588 | 10/1983 | Mausner | 123/492 X |
| 4,620,519 | 11/1986 | Nagao et al. | 123/492 |
| 4,655,179 | 4/1987 | Kashiwagura | 123/492 X |
| 4,800,860 | 1/1989 | Nanyoshi et al. | 123/492 |

FOREIGN PATENT DOCUMENTS

| 2430 | 1/1982 | Japan | 123/492 |
| 29733 | 2/1984 | Japan | 123/492 |
| 63-9646 | 1/1988 | Japan | . |

Primary Examiner—Tony M. Argenbright
Attorney, Agent, or Firm—Foley & Lardner, Schwartz, Jeffery, Schwaab, Mack, Blumenthal & Evans

[57] ABSTRACT

A fuel injection control system is directed a sequential injection type fuel injection internal combustion engine for injecting fuel to each engine cylinder at different timings. Acceleration enrichment asynchronous fuel injection is initiated in response to an acceleration demand. Acceleration enrichment is further performed for subsequent injection cycles to compensate for engine load indicative sensor signals which differ from actual engine load due to errors in an air flow meter.

32 Claims, 10 Drawing Sheets

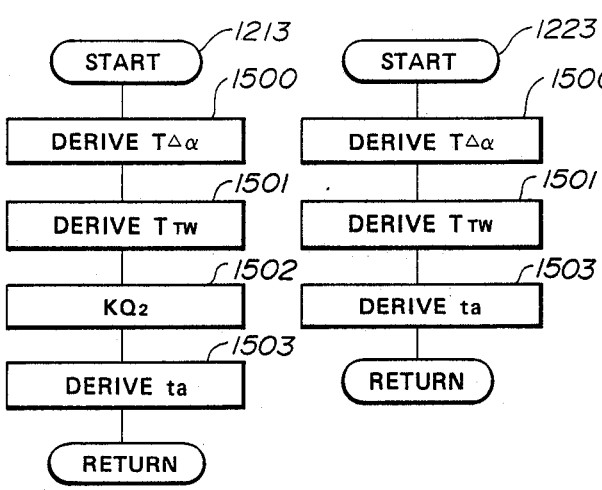
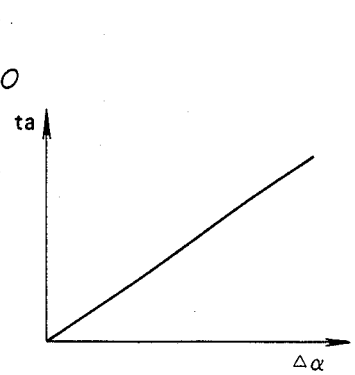
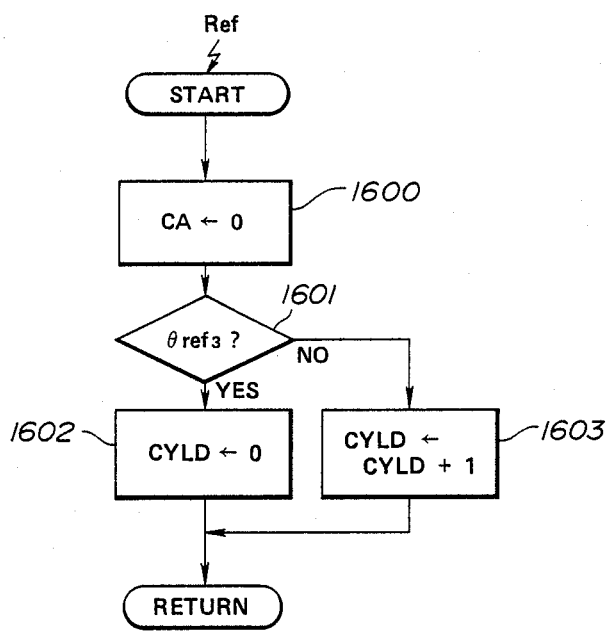
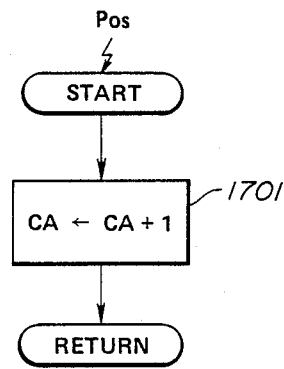

FUEL INJECTION CONTROL SYSTEM FOR MULTI-CYLINDER INTERNAL COMBUSTION ENGINE WITH FEATURE OF IMPROVED RESPONSE CHARACTERISTICS TO ACCELERATION ENRICHMENT DEMAND

CROSS REFERENCE OF RELATED APPLICATION

This application is a Continuation-In-Part of U.S. patent application Ser. No. 135,364, filed December 21, 1987 by Shinpei Nakaniwa et al.

BACKGROUND OF THE INVENTION

1. Field of the Invention

The present invention relates generally to a fuel injection control system for a multi-cylinder internal combustion engine, such as an automotive engine. More specifically, the invention relates to so-called sequential fuel injection control system which performs fuel injection for one of a plurality of engine cylinders independently of other engine cylinders at a timing around the induction top-dead-center (TDC) thereof so that the fuel injected an air/fuel mixture to be introduced into the corresponding cylinder. Further, the invention relates to an acceleration enrichment technique for the sequential injection type fuel injection system for the internal combustion engine.

2. Description of the Prior Art

Sequential injection type fuel injection control have been known as one of desirable fuel injection technique since it can allow precise fuel injection amount control depending upon the engine driving condition. Especially, such a type of fuel injection control has been regarded as beneficial to employ since it may exhibit better response characteristics in fuel injection amount control relative to variation of the engine load.

For independent fuel injection control for each of a plurality of engine cylinders in a multi-cylinder internal combustion engine, fuel injection valves or injectors are provided for injecting a controlled amount of fuel into respectively corresponding induction branches of an intake manifold of the induction system of the engine. Each of the fuel injection valves is controlled by a fuel injection pulse which has a pulse duration corresponding to the amount of the fuel to be injected. Namely, the fuel injection valve opens in response to the leading edge of the fuel injection pulse and closes in response to the trailing edge of the fuel injection pulse.

In conventional fuel injection timing control, the fuel injection start timing, i.e. the fuel injection valve open timing has been controlled relative to a crank shaft angular position so that fuel injection can be performed across the induction TDC, i.e. about the intake valve open timing. The fuel injection valve closing timing, in conventional fuel injection timing control, is determined depending upon the fuel injection amount and in relation to the fuel injection start timing.

In sequential fuel injection control, since substantially current fuel injection control parameters, such as an engine speed N and an air flow rate or an engine load Q, can be used, precise fuel injection amount control is possible, in comparison with single-spot fuel injection or group cylinder injection which performs fuel injection for more than one engine cylindes. However, since fuel injection is maintained across the induction TDC where the intake valve opens, only part of the fuel collides into the valve head of the intake valve and a thus atomized to establish a uniform mixture rate of air/fuel mixture. Remaining fuel is maintained in a state not satisfactorily atomized and is introduced into the engine combustion chamber in the relatively low temperature liquid state. Therefore, the temperature of the air/fuel mixture to be introduced into the combustion chamber becomes relatively low. This lowers combustion efficiency and propagation in the combustion engine. Thus, the engine performance and drivability tends to be degraded at certain engine driving conditions where a relatively large amount of fuel is required for causing expansion of the fuel injection pulse width over the intake valve open timing.

In order to avoid such defects, the Japanese Patent First (unexamined) Publication (Tokkai) Showa No. 59-29733 discloses a sequential fuel injection control technique. In the disclosed fuel injection control, the timing of the fuel injection pulse is determined so that the trailing edge of the fuel injection pulse should not be delayed after the induction TDC of the corresponding engine cylinder. Therefore, the timing of the leading edge of the fuel injection pulse is varied depending upon the required fuel injection amount. In this case, fuel injection can always be performed between the induction TDC to sufficiently heat the air/fuel mixture for better engine performance and drivability.

However, on the other hand, in such fuel injection control, since the fuel injection pulse is set to close the fuel injection valve at a fixed crank shaft angular position before the induction TDC of the corresponding engine cylinder, the pulse duration should be fixed after starting fuel injection. In other words, in this type fuel injection control, the fuel injection control parameters which can be used for actual fuel injection control cannot be the substantially current data but are necessarily the instantaneous data immediately before the occurrence of the fuel injection pulse. This clearly degrades response characteristics of the fuel injection control relative to the engine load variation.

In addition, when substantial change in engine acceleration occurs during fuel injection, the air/fuel mixture to be established becomes too lean to degrade the engine acceleration characteristics.

In order to improve such a defect in the prior proposed system, there is another proposal in the Japanese Patent First Publication (Tokkai) Showa No. 63-9646 which corresponds to the co-pending U.S. patent application Ser. No. 067,007, filed on June 29, 1987, now abondoneds and which proposes to fix the fuel injection terminating timing at the crank shaft angular position corresponding to the induction TDC of the corresponding engine cylinder. This allows all of the fuel injected to collide onto the valve head of the intake valve and to become satisfactorily atomized for establishing a substantially uniform air/fuel mixture. In the proposed system, the duration of operating the fuel injection valve is expanded to compensate the fuel amount required by the increase of the engine load when the engine load is increased during fuel injection. This is successful in preventing the air/fuel mixture from becoming too lean.

However, a problem is encountered due to delay of response in an air flow meter which measures the induction air flow rate. Namely, the air flow rate indicative signal tends to indicate a smaller air flow rate than the actual amount at the initial stage of increase of the engine load. Since the expansion of the fuel injection pulse duration is determined according to the air flow rate indicative signal, the smaller air flow rate indicative signal value results in a smaller expansion rate of the fuel injection valve duration. This makes the engine acceleration characteristics not precisely in according with engine acceleration demand.

SUMMARY OF THE INVENTION

Therefore, it is a principle object of the present invention to provide a fuel injection control system, which uses sequential injection to provide better response characteristics to variation of an engine load condition.

Another object of the present invention is to provide an acceleration enrichment technique for increasing the fuel injection amount precisely according to increase of the engine load.

A further object of the invention is to provide a fuel injection control system which may compensate delay of response of an air flow meter which monitors the engine load condition and the thus can allow fuel injection control to be precisely in accord with the engine driving condition with improved engine acceleration characteristics.

In order to accomplish the aforementioned and other objects, a fuel injection control system, according to the present invention, is directed to a sequential injection type fuel injection internal combustion engine for injecting fuel to each engine cylinder at different timings. Acceleration enrichment asynchroneous fuel injection is initiated in response to an acceleration demand. Acceleration enrichment is further performed for subsequent given injection cycles for compensation of smaller engine load indicative sensor signals than actual engine load due to error in an air flow meter.

According to one aspect of the invention, a fuel injection control system for a multi-cylinder internal combustion engine including at least first and second engine cylinders, comprises first and second fuel injection valves corresponding to the first and second engine cylinders, each being provided for injecting fuel into the corresponding engine cylinders at respectively independent timing, a sensor means monitoring fuel injectin control parameters including an engine load and engine speed and producing fuel injection control parameter indicative sensor signals, a detector means for detecting engine acceleration demand for producing an acceleration demand indicative signal, a controller unit for deriving a fuel injection amount to be injected through the first and second fuel injection valves, deriving fuel injection start timing and fuel injection terminating timing for each of the first and second fuel injection valves so that the fuel injection terminating timing is set at the beginning of an induction stroke of the corresponding cylinder, and controlling the first and second fuel injection valves for performing fuel injection at controlled timings, the control unit being responsive to the acceleration demand indicative signal for deriving a fuel injection amount for acceleration enrichment to perform fuel injection irrespective of engine driving stroke for one of the first and second fuel injection valves, and to delay the fuel injection terminating timing for a given period for subsequent given fuel injection timings.

According to another aspect of the invention, a fuel injection control system for a multi-cylinder internal combustion engine including at least first and second engine cylinders connected to an induction system for introducing an air/fuel mixture through intake ports which are closed by first and second intake valves designed to be driven to open during an induction stroke of the corresponding engine cylinders, comprises a first fuel injection valve corresponding to the first engine cylinder for injecting fuel thereto, second fuel injection valve corresponding to the second engine cylinder for injecting fuel thereto, a sensor means for monitoring fuel injection control parameters including an engine load and engine speed and producing a fuel injection control parameter indicative sensor signal, a detector means for detecting engine acceleration demand for producing an acceleration demand indicative signal, a controller unit for deriving a fuel injection amount to be injected through the first and second fuel injection valves on the basis of the fuel injection control parameter indicative sensor signal, deriving fuel injection start timing and fuel injection terminating timing for each of the first and second fuel injection valves so that the fuel injection terminating timing of the first fuel injection valve is set at the open timing of the intake valve in the induction stroke of the first engine cylinder and the fuel injection terminating timing of the second fuel injection valve is set at the open timing of the intake valve in the induction stroke of the second engine cylinder and controlling the first and second fuel injection valves for performing fuel injection at respective set timings, the control unit being responsive to the acceleration demand indicative signal for deriving a fuel injection amount for acceleration enrichment to perform fuel injection irrespective of the engine driving stroke for one of the first and second fuel injection valves which corresponds to one of the first and second engine cylinders in an induction stroke, and to delay the fuel injection terminating timing across the intake valve open timing for a given period for subsequent occurrence of fuel injection for the other of the first and second fuel injection valves.

In the preferred construction, the detector means is associated with the sensor means for monitoring variation of the magnitude of the engine load to detect acceleration demand for the engine and varies the value of the acceleration demand indicative signal, and the controller derives the fuel injection amount for acceleration enrichment on the basis of the acceleration demand indicative signal value. The sensor means may also include a throttle angle sensor for monitoring throttle valve angular position to produce a throttle angle indicative signal, and the detector means receives the throttle angle indicative signal for monitoring variation of the value of the throttle angle indicative signal for deriving the acceleration demand indicative signal value.

The control unit may detect the engine driving condition satisfying a predetermined fuel cut-off condition on the basis of the sensor signal and control the first and second fuel injection control valves to disable fuel injection, and is responsive to the acceleration demand indicative signal during a fuel cut-off state or immediately after fuel resumption to modify the fuel injection amount for acceleration enrichment by adding a given value. The control unit also modifies the fuel injection amount for acceleration enrichment on the basis of the sensor signal values. The control unit further modifies the fuel injection amount for acceleration enrichment on the basis of the magnitude of a preselected enrichment correction parameter indicated in the sensor signal.

The sensor means may include a sensor for monitoring the engine temperature condition for producing an engine temperature condition indicative signal and the control unit derives a correction value for the fuel injection amount for acceleration enrichment on the basis of the engine temperature condition indicative signal value. The control unit may derive a basic fuel injection amount on the basis of the engine speed and engine load and modify the fuel injection amount for acceleration enrichment on the basis of the basic fuel injection amount. In the alternative, the control unit modifies the fuel injection amount for acceleration enrichment on the basis of the sensor signal indicative of the engine load condition. On the other hand, the control unit may also modify the fuel injection amount for acceleration enrichment on the basis of the sensor signal indicative of the engine speed.

Furthermore, the sensor means may further include a crank angle sensor for monitoring an engine crank shaft angular position for producing a crank reference signal at every predetermined crank shaft angular position, and the control unit measures intervals between ocurrence of the crank reference signal for projecting the timing of the beginning of the induction stroke of each engine cylinder and determines the fuel injection start timing and the fuel injection terminating timing on the basis thereof.

In the further preferred process, the control unit is detective of the end of the induction stroke of each cylinder, at which an intake valve closes, for terminating fuel injection for the corresponding engine cylinder.

According to a further aspect of the invention, a fuel injection control system for a multi-cylinder internal combustion engine including at least first and second engine cylinders connected to an induction system for introducing an air/fuel mixture through intake ports which are closed by first and second intake valves designed to be driven to open during an induction stroke of the corresponding engine cylinders, comprises a first fuel injection valve corresponding to the first engine cylinder for injecting fuel thereto, a second fuel injection valve corresponding to the second engine cylinder for injecting fuel thereto, a first sensor for monitoring an engine load for producing an engine load indicative first sensor signal, a second sensor for monitoring a crank shaft angular position for producing a crank reference signal at every predetermined angular position of the crank shaft, a first detector means for detecting a engine revolution speed for producing an engine speed indicative first detector signal, a second detector means for detecting engine acceleration demand for producing an acceleration demand indicative second detector signal, first means, active cyclically at a given first time interval, for deriving a fuel injection pulse width on the basis of the first sensor signal value and the first detector signal value, second means, active in response to the crank reference signal, for identifying one of the first and second engine cylinders to perform fuel injection, and for setting a fuel injection start timing and a fuel injection terminating timing for one of the first and second fuel injection valves corresponding to the identified one of the first and second engine cylinders in such a manner that the fuel injection terminating timing is set at a timing at which the intake valve of the identified one of first and second engine cylinders starts to open, third means, active cyclically with at a given second time interval which is shorter than the first time interval, for detecting the set fuel injection start timing and the fuel injection terminating timing to operate one of first and second fuel injection valves, fourth means for detecting engine acceleration demand for producing an acceleration demand indicative signal and detecting one of first and second engine cylinders in the induction stroke, for operating one of first and second fuel injection valves corresponding to a detected one of first and second engine cylinders irrespective of set timings, for performing acceleration enrichment injection, and fifth means, active at every fuel injection terminating timing, for an responsive to the acceleration demand indicative signal for delaying the fuel injection terminating timing for additional period of fuel injection for acceleration enrichment.

BRIEF DESCRIPTION OF THE DRAWINGS

The present invention will be understood more fully from the detailed description given herebelow and from the accompanying drawings of the preferred embodiment of the invention, which, however, should not be taken to limit the invention to the specific embodiment but are for explanation and understanding only.

In the drawings:

FIG. 8 is a flowchart of a sub-routine to be triggered during execution of the 10 ms interrupt routine of FIG. 5;

FIG. 9 is a flowchart of a sub-routine to be triggered during execution of the 10 ms interrupt routine of FIG. 5;

FIG. 10 is a chart showing variation of a fuel injection pulse duration for asynchronous injection, in relation to an increase of engine load;

FIG. 12 is a flowchart showing a routine to be triggered in response to the crank reference signal for identifying the engine cylinder for which asynchronous fuel injection is to be inhibited;

FIG. 13 is a flowchart of an interrupt routine to be triggered in response to every crank position signal to count-up the occurrence of the crank position signals and thereby detect the crank shaft angular position;

DESCRIPTION OF THE PREFERRED EMBODIMENT

Figure 1:
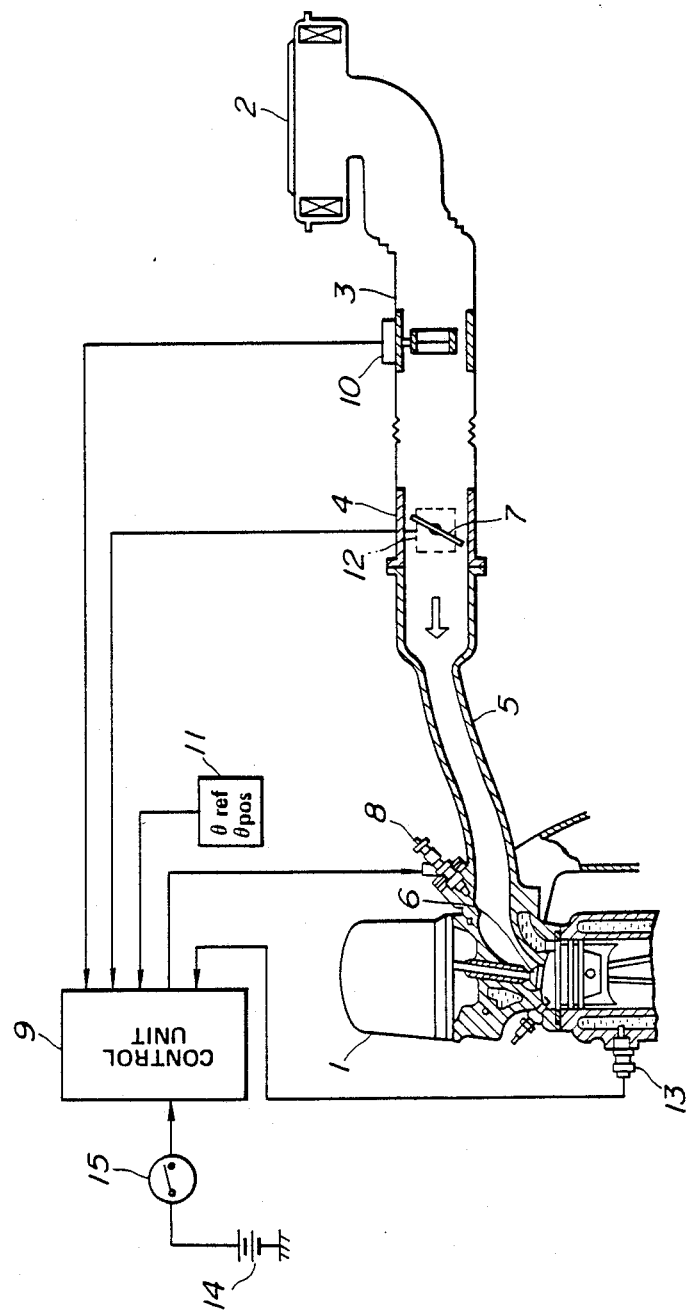
FIG. 1 is a schematic block diagram of the preferred embodiment of a fuel injection control system according to the present invention.
Figure 2:
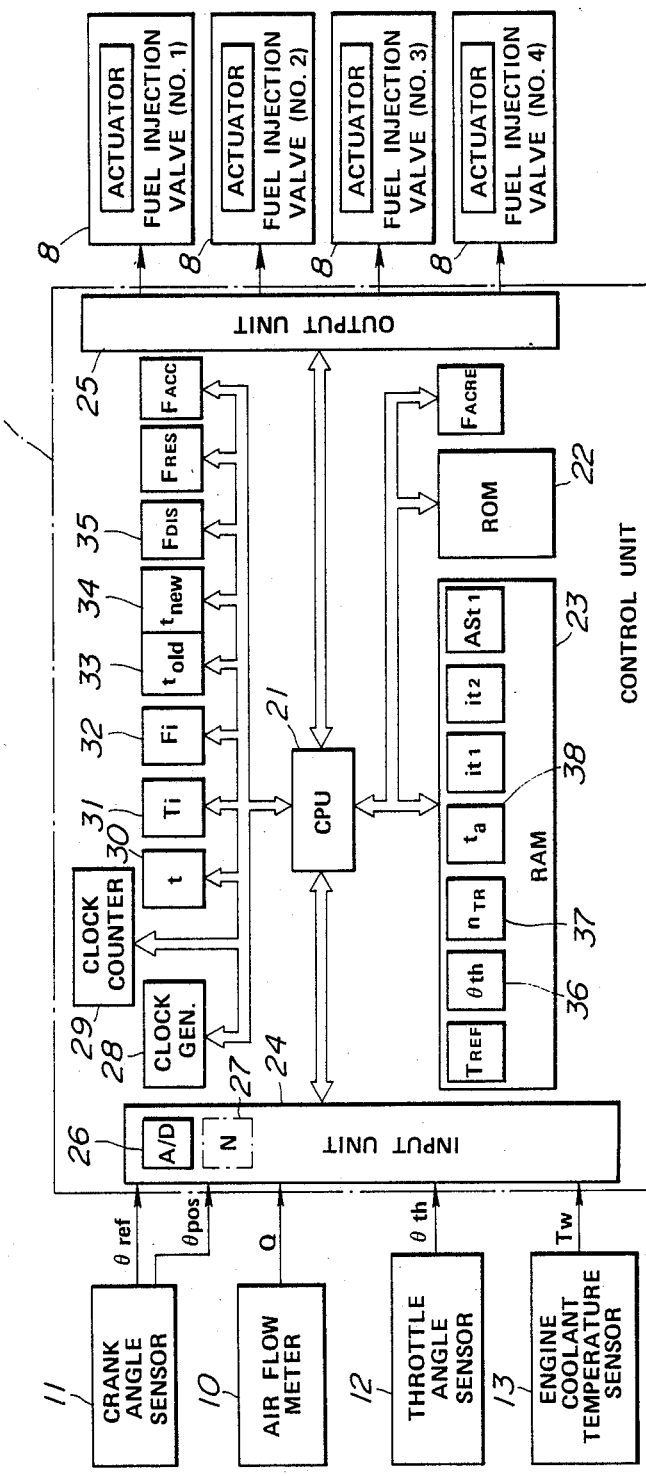
FIG. 2 is a block diagram of a control unit in the preferred embodiment of a fuel injection control system of FIG. 1.

Referring now to the drawings, particularly to FIGS. 1 and 2, the preferred embodiment of a fuel injection control system, according to the present invention, is specifically adapted for a sequential injection type fuel injection system for an internal combustion engine 1 which is designed for injecting a controlled amount of fuel for each cylinder near or at an induction TDC independently to that for other cylinders. The engine 1 has an air induction system including an air cleaner 2, an induction pipe 3, a throttle chamber 4, an intake manifold 5 and an intake port operably closed by means of an intake valve 6. A throttle valve 7 is disposed within the throttle chamber 4 to adjust air flow path area depending upon the position of an accelerator pedal (not shown).

A plurality of fuel injection valves 8 (only one is shown) is provided for injecting fuel into the air induction system for forming an air/fuel mixture to be combustioned in combustion chambers defined in each engine cylinder. In order to perform fuel injection for each engine cylinder independently of that for other cylinders, each fuel injection valve 8 is directed to a corresponding one of branch passages of the intake manifold 5. The fuel injection valve 8 incorporates an electromagnetic actuator 8a for driving the fuel injection valve between open and closed positions. Namely, as is well known, the electromagnetic actuator 8a is responsive to a HIGH level fuel injection pulse to open for injecting fuel and to close while the fuel injection pulse is held LOW level. The open period of the fuel injection valve 8 is thus determined according to the duration of the HIGH level fuel injection pulse.

In order to determine the fuel injection pulse duration depending on the engine driving condition and to send the fuel injection pulse to each of the electromagnetic actuators 8a at an appropriate timing, a microprocessor based control unit 9 is provided in the fuel injection control system. The control unit 9 is connected to an air flow meter 10 to receive therefrom an air flow rate indicative signal which is indicative of an air flow rate Q representative of the engine load condition. In the shown embodiment, the air flow meter 10 comprises a hot wire type air flow meter.

The control unit 9 is also connected to a crank angle sensor 11 which is built-in a distributor (not shown) in a spark ignition system of the engine. In the alternative, the crank angle sensor may be directly associated with a crank shaft for monitoring the rotational angular position thereof. The crank angle sensor 11 is designed to output a crank reference signal at every predetermined angular position, e.g. 70° before TDC (70° BTDC) of each engine cylinder, and a crank position signal at every given angular displacement of the crank shaft, e.g. 1° of 2°. Furthermore, in the preferred construction, the crank angle sensor 11 is designed so as to output the crank reference signal indicative of 70° BTDC of specific engine cylinders, e.g. No. 1 cylinder.

The control unit 9 is further connected to a throttle angle sensor 12 which is associated with a throttle valve 7 for monitoring angular position of the latter to produce a throttle angle indicative signal $\theta_{th}$. This throttle angle indicative signal $\theta$ essentially represents acceleration and deceleration demand input through the accelerator pedal by the driver. In addition, the control unit 9 is connected to an engine coolant temperature sensor 13 disposed within an engine cooling chamber to monitor the temperature condition of the engine coolant to produce an engine coolant temperature indicative signal Tw. Furthermore, the control unit 9 is connected to a vehicular battery 14 via an ignition switch 15 which serves as a main power supply switch.

As particularly shown in FIG. 2, the control unit 9 generally comprises a microprocessor 20 including CPU 21, ROM 22, RAM 23, an input unit 24 and an output unit 25. The input unit 24 incorporates an analog-to-digital (A/D) converter 26 for converting the analog form sensor signals from the air flow meter 10, the throttle angle sensor 12 and the engine coolant temperature sensor 13, into digital signals to be processed by the microprocessor.

As seen from FIG. 2, the microprocessor 20 incorporates an internal or external clock generator 28 for outputting clock pulses. Also, the microprocessor 20 has a clock counter 29 for counting up the clock pulses for measuring elapsed periods of time. This counter value of the clock counter 29 may be used as time indicative data for triggering a time based interrupt program, such as a 10 ms interrupt program which will be discussed later. Also, the counter value of the clock counter 29 may be utilized as elapsed time indicative data for derivation of the engine speed data N.

Figure 3:
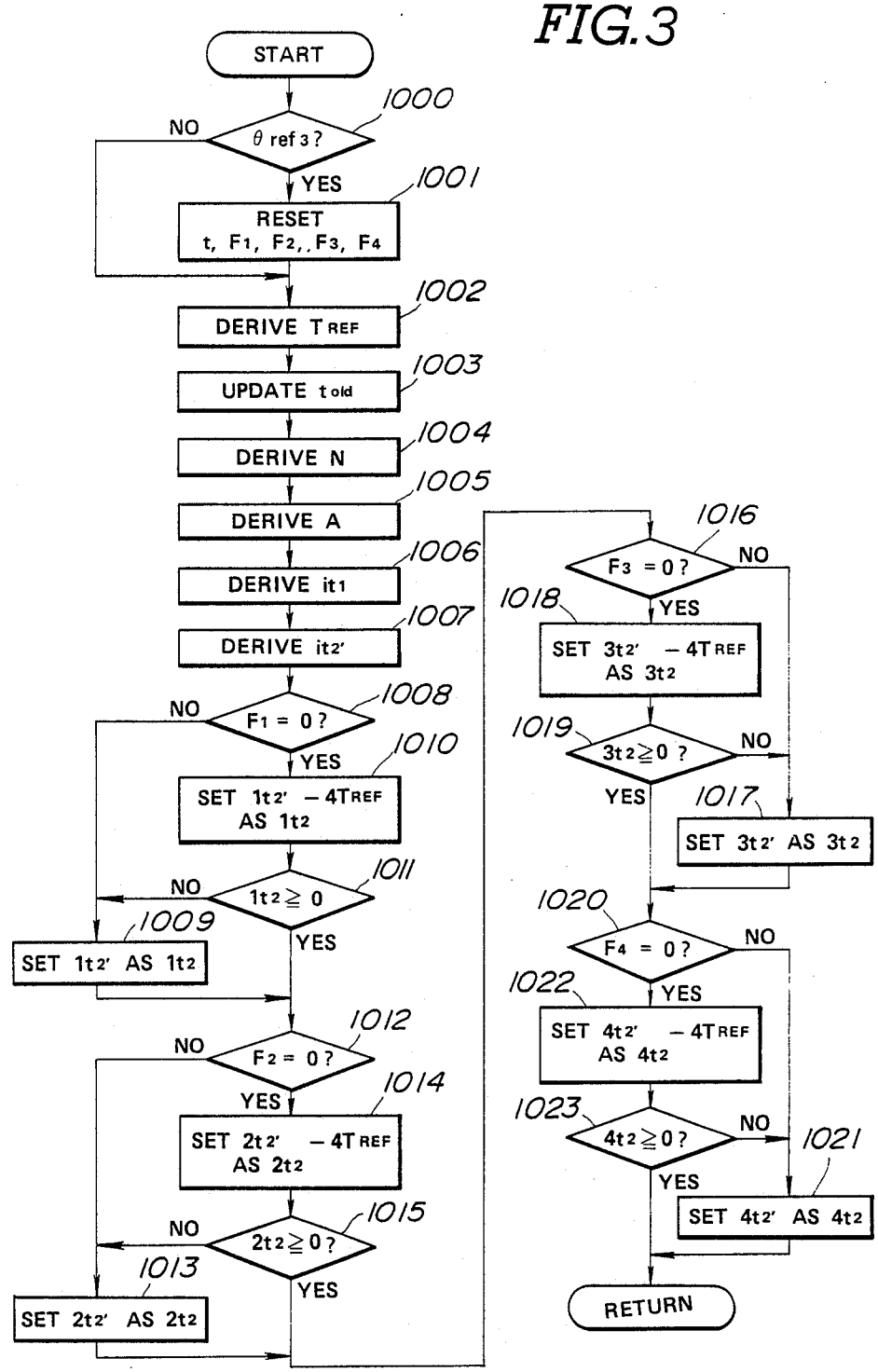
FIG. 3 is a flowchart of an interrupt routine to be executed in response to a crank reference signal, for determining fuel injection start timing.
Figure 4:
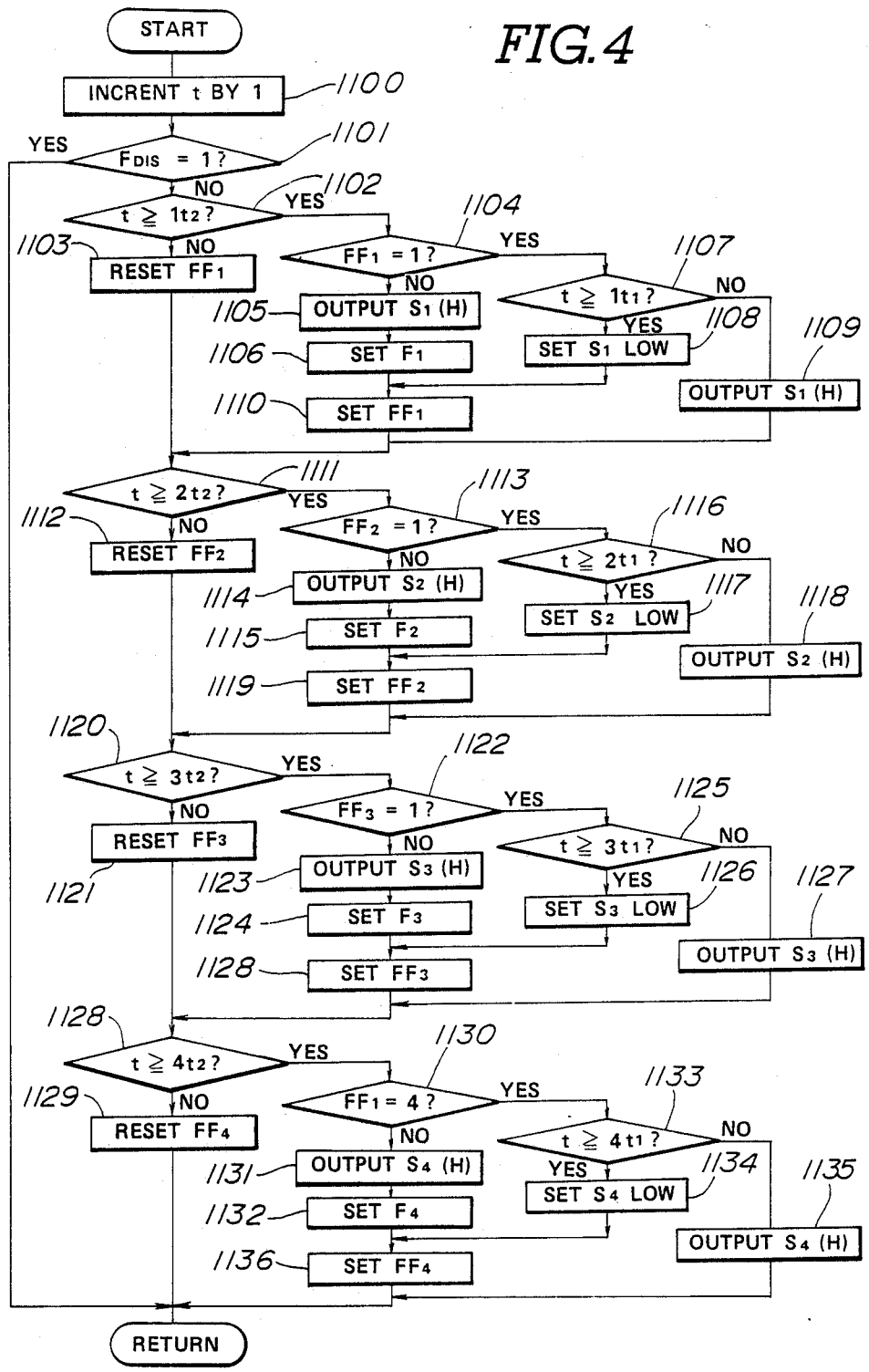
FIG. 4 is a flowchart of an interrupt routine to be executed every 1 ms for detecting the fuel injection start timing.
Figure 5:
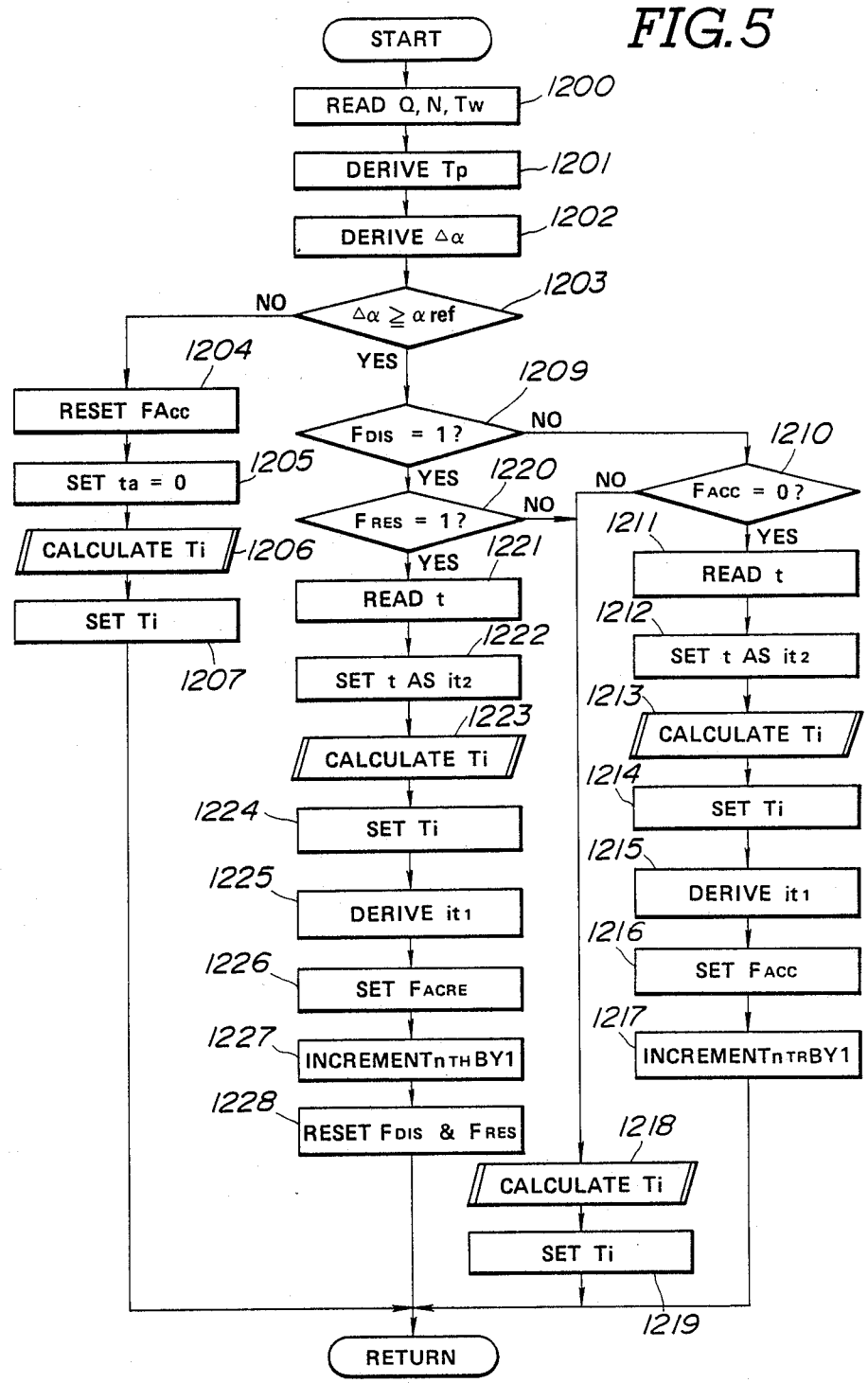
FIG. 5 is a flowchart of an interrupt routine to be executed every 10 ms for detecting acceleration demand and for performing asynchronous fuel injection for acceleration enrichment.
Figure 6:
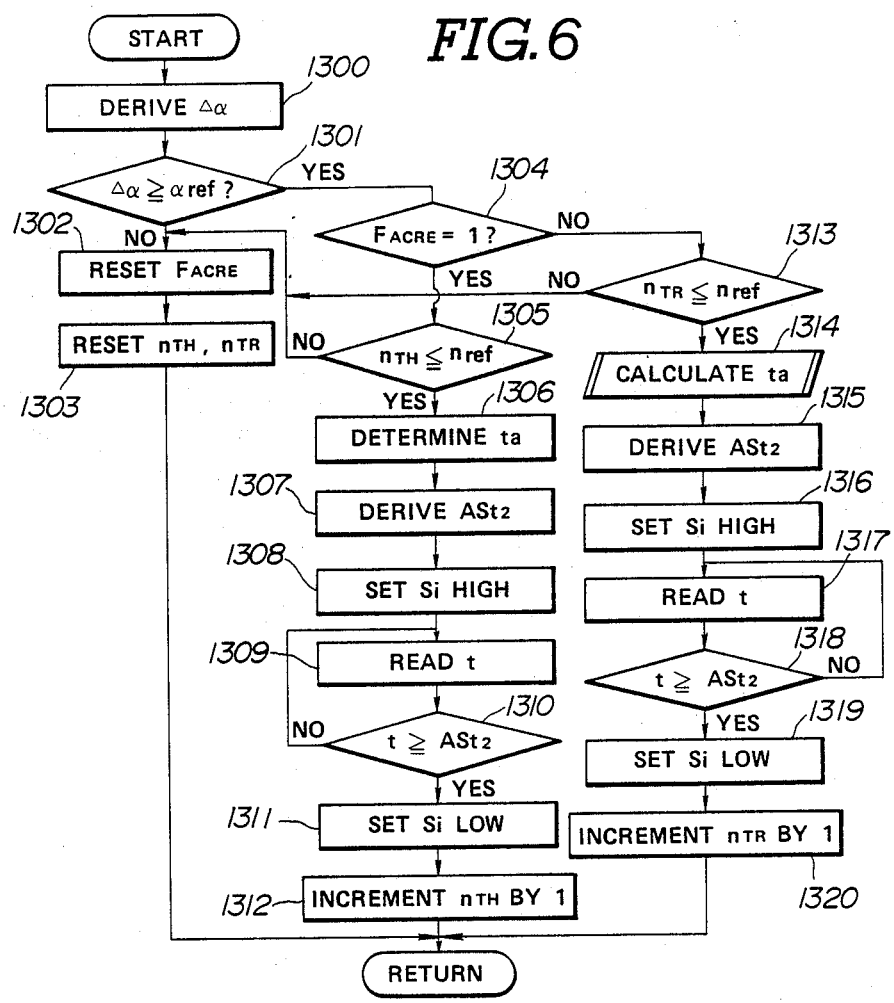
FIG. 6 is a flowchart of an interrupt routine to be triggered in response to each trailing edge of the fuel injection pulse to detect acceleration demand and perform asynchronous fuel injection for acceleration enrichment.

The process of fuel injection control to be performed by the foregoing preferred embodiment of the fuel injection control system will be discussed herebelow with reference to FIGS. 3 to 8. The routines illustrated in FIGS. 3 to 6 are respectively established as interrupt routines of a main program which constitute a background job for governing various control routines. In automotive engine control, the signal control unit may perform various control operations, such as fuel injection control, engine idling speed control, spark ignition timing control, exhaust gas recirculation rate (EGR) control, air/fuel mixture rate control (λ control) and so forth. These various operations are performed on a time sharing basis as governed by the background job. In the routines illustrated in FIGS. 3 through 6, the routine of FIG. 3 is designed to be triggered at every occurrence of the crank reference signal $\theta_{ref}$ for setting the fuel injection start and end timing. The routine of FIG. 4 is triggered every 1 ms for incrementing fuel injection timer 30 (shown in FIG. 2) and detecting the fuel injection timing based on the timer value to trigger a corresponding one of the electromagnetic actuators of the fuel injection valves 8 for starting fuel injection. The routine of FIG. 5 is designed to be triggered every 10 ms for deriving a fuel injection pulse duration on the basis of a preselected fuel injection control parameter, such as the engine speed N, the engine load or air flow rate Q, the engine coolant temperature Tw and so forth. The routine of FIG. 6 is to be triggered in response to the trailing edge of each fuel injection pulse to detect engine acceleration demand and perform asynchroneous fuel injection for acceleration enrichment.

As set forth above, the routine of FIG. 3 derives fuel injection start and end timings. This interrupt routine is triggered in response to the crank reference signal $\theta_{ref}$ generated 70° BTDC of each engine cylinder. In practice, setting of the fuel injection start timing and end timing in execution of the routine of FIG. 3 is performed on the basis of the fuel injection pulse width Ti derived during the 10 ms interrupt routine of FIG. 5. In practice, the fuel injection pulse duration as derived in execution of the routine of FIG. 5 and updated every 10 ms is set in a fuel injection pulse duration register (Ti register) 31 of the microprocessor 20.

In the shown embodiment, the fuel injection control is applied for a 4-cylinder engine which performs fuel injection in the order of No. 1 - No. 3 - No. 4 - No. 2. The crank reference signal to be generated 70° BTDC of No. 3 cylinder is provided with a pulse duration different from the crank reference signals of the other cylinders. Therefore, in the shown embodiment, the No. 3 cylinder serves as the specific cylinder. Namely, the crank shaft angular position where the crank reference signal $\theta_{ref}$ indicative of 70° BTDC of No. 3 cylinder is taken as the crank shaft initial position. Hereafter, the crank reference signal $\theta_{ref}$ produced 70° BTDC of the No. 3 cylinder will be referred to as "specific crank reference signal $\theta_{ref3}$." In practice, the specific crank reference signal $\theta_{ref3}$ has a longer duration than that of the other cylinders.

Immediately after starting execution of the interrupt routine of FIG. 3, the duration of the crank reference signal $\theta_{ref}$ as received from the crank angle sensor 11 is compared with a preset value corresponding to the pulse duration of the specific crank reference signal $\theta_{ref3}$, at a step 1000. When the pulse duration of the received crank reference signal $\theta_{ref}$ is equal to the specific crank reference signal $\theta_{ref3}$, the process goes to a step 1001 in which the fuel injection timer 30 is reset to zero '0'. At the same step 1001, all of fuel injecting cylinder identification flags $F_1$, $F_2$, $F_3$ and $F_4$ which are set (1) and reset (0) in a flag register 32 of the microprocessor 20 are reset.

After the process at the step 1001 or when the pulse duration of the crank reference signal $\theta_{ref}$ as checked at the step 1000 is shorter than the preset value, the process goes to a step 1002. At the step 1002, a reference time data $t_{old}$ which represents timing of occurrence immediately preceding of crank reference signal $\theta_{ref}$, is registered in a reference time data register ($t_{old}$ register) 33.

The timer 30 is latched in response to the crank reference signal $\theta_{ref}$ which triggers the routine of FIG. 3 and which is transferred as current time data $t_{new}$ to a current time register ($t_{new}$ register) 34.

At the step 1002, the reference time data $t_{old}$ read from the $t_{old}$ register 33 is subtracted from the current time data $t_{new}$ read from the $t_{new}$ register 34 to derive the interval between the subsequent occurrences of the immediately preceding and current crank reference signals $\theta_{ref}$. The resultant value serves as engine speed indicative value $T_{REF}$. This $T_{REF}$ value is set in an appropriate memory block ($T_{REF}$ address) in RAM 23, at the step 1002. After the process in the step 1002, the current time data $t_{new}$ in the $t_{new}$ register 34 is transferred to the $t_{old}$ register 33 as the reference time data $t_{old}$, at a step 1003.

At a step 1004, the $T_{REF}$ value is read out from the $T_{REF}$ address of RAM 23. Based on this $T_{REF}$ value, the engine speed data N is derived.

Though the preferred process utilizes the interval of occurrences of the subsequently occurring crank reference signals for deriving the engine speed, it is possible to drive the engine speed data N in various ways. For example, the input unit 24 may incorporate an engine speed counter 27 (as shown by the phantom line in FIG. 2) for counting a predetermined number of crank position signals and measuring the elapsed time for reaching the predetermined count, or, in the alternative for counting the crank position signal within a given period for deriving an engine speed data N.

At a step 1005 following the step 1004, a fuel injection end timing correction value A is determined. Though this step is not always necessary, it is preferable to correct the fuel injection end timing depending upon the engine conditions, such as the intake valve actuation characteristics, for fine adjustment. In practice, the correction value A may be preset in a form of a look-up table to be looked up in terms of the engine speed data N.

At a step 1006, the fuel injection end timing $it_1$ (i: 1, 2, 3, 4=cylinder No.) for each of the four fuel injection valves 8 for each of the engine cylinders is determined on the basis of the $T_{REF}$ value, the correction value and an acceleration enrichment value ta, derivation of which will be discussed later. In practice, respective fuel injection end timings $it_1$ are calculated from the following equations:

$$1t_1 = T_{REF} \times A + ta$$

$$2t_1 = T_{REF} \times (A - 1) + ta$$

$$4t_1 = T_{REF} \times (A - 2) + ta$$

$$3t_1 = T_{REF} \times (A + 1) + ta$$

Based on the fuel injection end timing $it_1$ derived in the step 1006, fuel injection start timing data $it_2$, is derived at a step 1007. In the process in the step 1007, calculation according to the following equations are performed to derive $it_2$, values.

$$1t_2 = 1t_1 - Ti$$

$$2t_2 = 2t_1 - Ti$$

$$4t_2 = 4t_1 - Ti$$

$$3t_2 = 3t_1 - Ti$$

Thereafter, the fuel injecting cylinder identification flag $F_1$ is checked at a step 1008, whether the flag is set or reset in the flag register 32. The set condition of the fuel injecting cylinder identification flag $F_1$ indicates that fuel injection for No. 1 cylinder was already performed in the corresponding engine revolution cycle. On the other hand, when the fuel injecting cylinder identification flag $F_1$ is in a reset condition, it indicates that fuel injection for the No. 1 cylinder has not yet been performed. If the fuel injecting cylinder identification flag $F_1$ is in the set (1) condition, the $1t_2$, value as derived at the step 1007 is set as fuel injection start timing $1t_2$ for the No. 1 cylinder, at a step 1009.

On the other hand, when the fuel injecting cylinder identification flag $F_1$ is in a reset condition, the fuel injecting timing $1t_2$ for the No. 1 cylinder is set at a value ($1t_2$-$4T_{REF}$), at a step 1010. The resultant fuel injection timing $1t_2$ is checked whether it is greater than or equal to zero, at a step 1011. When the No. 1 cylinder fuel injection timing indicative value $1t_2$ is smaller than zero, the process goes to the step 1009 to set $1t_2$, as derived at the step 1007 as the fuel injection timing indicative value.

Similar processes at the steps 1008 to 1011 are performed in steps 1012 to 1015 for setting the fuel injection start timing for the No. 2 cylinder. Also, steps 1016 to 1019 are performed for setting the fuel injection start timing for the No. 3 cylinder. Furthermore, the steps 1020 to 1023 are performed for setting the fuel injection start timing for the No. 4 cylinder.

After the step 1021 or 1023, the process returns to the background job.

FIG. 4 shows the 1 ms interrupt routine to be executed every 1 ms for detecting the fuel injection timing for each cylinder.

Immediately after starting execution, the value t in the timer 30 is incremented by 1, at a step 1100. After incrementing the timer value t, a fuel cut flag $F_{DIS}$ set in a fuel cut flag register 35 is checked at a step 1101. If the fuel cut flag $F_{DIS}$ is set (1) when checked at the step 1001, the process goes directly to end and returns to the background job. On the other hand, when the fuel cut flag $F_{DIS}$ is reset (0) when checked at the step 1101, which indicates that fuel injection is to be performed, the fuel injection timer value t is incremented by "1", at a step 1102. The timer valve t of the fuel injection timer is compared with the set fuel injection start timing value $1t_2$ for the No. 1 cylinder, at the step 1102. When the fuel injection timer value t is smaller than the set fuel injection start timing value $1t_2$ when checked at the step 1102, a fuel injection timing flag $FF_1$ in the flag register 32 is reset (0), at a step 1103.

On the other hand, if the fuel injection timer value t is greater than or equal to $1t_2$ as compared at the step 1102, the fuel injection timing flag $FF_1$ is checked at a step 1104. If the fuel injection timing flag $FF_1$ is in the reset condition (0), which represents that the fuel injection timer value t is just increased over or reaches the set No. 1 cylinder fuel injection starting timing value $1t_2$, the fuel injection pulse $S_1$ to be applied to the actuator $8a$ of the fuel injection valve 8 corresponding to the No. 1 cylinder, is set to HIGH (1) and output, at a step 1105. After the step 1105, the fuel injecting cylinder identification flag $F_1$ is set (1), at a step 1106.

On the other hand, when the fuel injection timing flag $FF_1$ (1) which indicates that fuel injection for the No. 1 cylinder in the relevant engine revolution cycle is already triggered, the fuel injection timer value t is compared with the No. 1 cylinder fuel injection terminating timing value $1t_1$ derived at the step 1006 of the foregoing interrupt routine of FIG. 3, at a step 1107. If the fuel injection timer value t is smaller than the set fuel injecting terminating timing value $1t_1$ as checked at the step 1107, the fuel injection pulse $S_1$ is again set to a HIGH level at a step 1109. On the other hand, when the fuel injection timer valve t is greater than or equal to the No. 1 cylinder fuel injection terminating timing value $1t_1$, the fuel injection pulse $S_1$ for the actuator of the fuel injection valve 8 for the No. 1 cylinder is set LOW (0), at a step 1108.

After the step 1106 or 1108, the process goes to a step 1110, in which the fuel injection timing flag $FF_1$ is set (1).

A process similar to steps 1101 to 1110 is performed through steps 1111 to 1119 for detecting fuel injection timing for the No. 2 cylinder and performing fuel injection. Steps 1120 to 1128 are performed for detecting fuel injection timing for the No. 3 cylinder and performing fuel injection. Also, steps 1129 to 1136 are performed for detecting the fuel injection timing for the No. 4 cylinder to perform fuel injection.

After the step 1129, 1136 or 1135, the process returns to the background job.

FIG. 5 is the 10 ms interrupt routine for determining the duration of fuel injection, i.e. the period to maintain the HIGH level fuel injection pulse. Immediately after starting execution, the engine driving parameters, i.e. the engine speed N, the engine load Q and the engine coolant temperature Tw are read, at a step 1200. Based on the engine speed N and the engine load Q, the basic fuel injection pulse width Tp (=Kconst ×Q/N, Kconst: constant) is derived at a step 1201. Then, the throttle angle indicative signal value $\theta_{th}$ is read and compared with the throttle angle indicative signal value $\theta_{th}$ which was read during the immediately preceding cycle of execution of the 10 ms interrupt routine, at a step 1202. As a result of comparison, a difference $\Delta \alpha$ which will be hereafter referred to as the "throttle angle variation indicative value", is obtained, at the step 1202.

In order to store the throttle angle data $\theta_{th}$, a temporary register 36 is provided in RAM 23 in the control unit 20. The temporary register 36 has two memory blocks for storing the throttle angle indicative signal value $\theta_{th}$ which is read in the immediately preceding execution cycle, and which will be hereafter referred to as the "old throttle angle indicative value $\theta old_{th}$", and the throttle angle indicative signal value $\theta_{th}$ which is read in the current execution cycle and which will be hereafter referred to as the "new throttle angle indicative value $\theta new_{th}$". The old throttle angle indicative value $\theta old_{th}$ is replaced with the new throttle angle indicative value $\theta new_{th}$, at the end of the process in the step 1202.

The throttle angle variation indicative value $\Delta \alpha$ is compared with a predetermined throttle angular variation criterion $\alpha_{ref}$, e.g. 1.6°, at a step 1203. This step 1203 is intended to detect engine acceleration demand. Namely, when the throttle angle variation indicative value is greater than or equal to the throttle angular variation criterion $\alpha_{ref}$, it indicates that engine acceleration is required. If the throttle angle variation indicative value $\Delta \alpha$ is smaller than the throttle angle variation criterion $\alpha_{ref}$, an acceleration enrichment demand indicative flag $F_{ACC}$ is reset (0) at a step 1204. After resetting the acceleration enrichment demand indicative flag $F_{ACC}$, an acceleration enrichment correction value ta is set to zero, at a step 1205. In conjunction with incorporating the acceleration enrichment correction value ta (=0), the HIGH level fuel injection pulse width is derived on the basis of the fuel injection control parameters, at a step 1206. In practice, the fuel injection pulse width is calculated on the basis of the basic fuel injection value Tp and fuel injection correction coefficient CORF. In practice, the fuel injection pulse correction coefficient COEF may be determined according to the following equation:

$$COEF = 1 + KAS + KTRM + KTW + KMR + KHOT + KCC - KDC$$

where
KAS is an after starting-up enrichment coefficient;
KTRM is a λ control (air/fuel mixture control based on oxygen concentration in the exhaust gas) error correction coefficient;
KTW is an engine coolant temperature Tw dependent correction coefficient;
KMR is output air/fuel ratio correction coefficient;

KHOT is a hot engine condition enrichment correction coefficient; and KCC is an acceleration enrichment correction value.

Utilizing the acceleration enrichment correction value ta (=0) and the fuel injection pulse correction coefficient derived according to the foregoing equation, the fuel injection pulse width Ti is determined utilizing the following equation:

$$Ti = 2Tp \times \lambda \times COEF + TS + ta$$

where $\lambda$ is a $\lambda$ control coefficient; and

TS is a fuel injection valve mechanical lag compensating coefficient.

Derived fuel injection pulse width Ti is set in the Ti register 31, at a step 1207.

On the other hand, when the engine acceleration demand, i.e. the throttle angle variation indicative value $\Delta\alpha$ greater than or equal to the throttle angular variation criterion $\alpha_{ref}$, is detected, as checked at the step 1203, the process goes to a step 1209.

At the step 1209, the fuel cut indicative flag $F_{DIS}$ is checked. This step 1209 is necessary for distinguishing the acceleration enrichment demand immediately after the fuel cut-off state from the acceleration enrichment demand occurring during normal engine driving conditions, in which fuel injection is performed. Namely, when the acceleration enrichment demand is detected at a step 1203 and the set condition of the fuel cut indicative flag $F_{DIS}$ is also detected, it means that acceleration enrichment demand occurs during a fuel cut-off state.

When the fuel cut indicative flag $F_{DIS}$ is reset (0) as checked at the step 1209, the flag condition represents that an acceleration enrichment demand indicative flag $F_{ACC}$ is checked at a step 1210. This step is necessary for discriminating the first fuel enrichment after occurrence of the acceleration enrichment demand, in normal engine driving conditions.

If the acceleration enrichment demand indicative flag $F_{ACC}$ is reset (0) as checked at the step 1210, judgement is made that the current calculation cycle is for the first occurrence of the acceleration enrichment after occurrence of the acceleration enrichment demand. Then, the fuel injection timer value t is read at a step 1211 and is set as the fuel injection start timing $2t_1$ at a step 1212. In this case, calculation of the fuel injection pulse width Ti is performed according to the process illustrated in FIG. 8. The fuel injection pulse width derivation process in the step 1213 will be discussed later with reference to FIG. 8. After deriving the fuel injection pulse width Ti, at the step 1213, the derived fuel injection pulse width Ti is set in the Ti register 31, at a step 1214. At a step 1215, the fuel injection terminating timing $1t_1$ is derived on the basis of the set fuel injection pulse width Ti and the fuel injection start timing $2t_1$ as set at the step 1212. Thereafter, the acceleration enrichment demand indicative flag $F_{ACC}$ is set at a step 1216. At a step 1217, a normal engine acceleration enrichment count value $n_{TR}$ in RAM address 37 in RAM is incremented by 1.

When the acceleration enrichment demand indicative flag $F_{ACC}$ is set (1) as checked at the step 1210, calculation of the fuel injection pulse width Ti is performed on the basis of the Tp, ta and COEF. The enrichment correction value ta is read from a RAM address 38 as set during calculation of the fuel injection pulse width Ti in the step 1213 or a step 1218 which will be discussed later, at a step 1218. The fuel injection pulse width Ti as derived at the step 1218, is set in the Ti register 31, at a step 1219.

On the other hand, if the fuel cut indicative flag $F_{DIS}$ is set as checked at the step 1209, a fuel resumption indicative flag $F_{RES}$ is checked at a step 1220. This step is intended to discriminate the acceleration enrichment immediately after fuel resumption from the acceleration enrichment of succeeding fuel injection cycles. At a step 1221, the fuel injection timer value t is read. The read fuel injection timer value t is set as the fuel injection start timing $2t_1$ at a step 1222. After the step 1222, calculation of the fuel injection pulse width Ti is performed at a step 1223. The process of derivation of the fuel injection pulse width Ti to be performed in the step 1223 will be discussed later with reference to FIG. 9. Derived fuel injection pulse width Ti is set in the Ti register 31, at a step 1224. After setting the fuel injection pulse width Ti derived at the step 1224, the fuel injection terminating timing $1t_1$ is derived on the basis of the fuel injection pulse width Ti set at the step 1224 and the fuel injection start timing $2t_1$ set at the step 1222, at a step 1225. A fuel resuming enrichment indicative flag $F_{ACRE}$ is set (1), at a step 1226.

At a step 1227, a fuel resumption enrichment count value $n_{TN}$ is incremented by 1. Thereafter, the fuel cut indicative flag $F_{DIS}$ and the fuel resumption indicative flag $F_{RES}$ are reset at a step 1228.

After the process at the step 1207, 1217, 1219 or 1228, the process returns to the background job.

FIG. 6 shows the interrupt routine to be triggered by the trailing edge of the HIGH level fuel injection pulse. Namely, this interrupt routine is executed at every end of fuel injection for performing extra fuel injection for acceleration enrichment.

Immediately after starting execution, the throttle angle variation indicative value $\Delta\alpha$ is derived substantially in the same process as that in the step 1202 of the interrupt routine of FIG. 5, at a step 1300. The throttle angle variation indicative value $\Delta\alpha$ is then compared with the throttle angular variation criterion $\alpha_{ref}$, at a step 1301. When the throttle angle variation indicative value $\Delta\alpha$ is smaller than the throttle angle variation criterion $\alpha_{ref}$, the fuel resumption enrichment indicative flag $F_{ACRE}$ is reset (0) at a step 1302. At a step 1303, the normal engine acceleration enrichment count value $n_{TR}$ and the fuel resumption enrichment count value $n_{TN}$ are reset (0). After the process in the step 1303, the process goes to the end to return to the background job.

When the throttle angle variation indicative value $\Delta\alpha$ is greater than or equal to the throttle angle variation criterion $\alpha_{ref}$ as checked at the step 1301, the process goes to a step 1304. At the step 1304, the fuel resumption enrichment indicative flag $F_{ACRE}$ is checked. If the fuel resumption enrichment indicative flag $F_{ACRE}$ is set (1) as checked at the step 1304, the fuel resumption enrichment count value $n_{TN}$ is compared with a predetermined enrichment cycle reference $n_{ref}$, at a step 1305.

The enrichment cycle reference $n_{ref}$ is set depending upon the desired fuel injection cycles over which acceleration enrichment is to be performed. Namely, when the enrichment cycle reference $n_{ref}$ is set at "4", it indicates that acceleration enrichment is performed at four occurrences of fuel injection. Assuming the engine is 4-cylinder engine and the enrichment cycle reference $n_{ref}$ is set at "4", the acceleration enrichment will be performed through one engine revolution cycle.

When the fuel resumption enrichment count value $n_{TN}$ is smaller than the enrichment cycle reference $n_{ref}$ as checked at the step 1305, calculation is performed for deriving the acceleration enrichment correction value ta at a step 1306. In the execution of the interrupt routine of FIG. 6, the acceleration enrichment correction value ta represents an additional fuel injection pulse width to expand the fuel injection valve open period.

Based on the acceleration enrichment correction value ta as derived at the step 1306, the fuel injection terminating timing $ASt_1$ which represents the timing of termination of the acceleration enrichment fuel injection, is at a step 1308. After setting the fuel injection terminating timing $ASt_1$, the fuel injection pulse Si for the corresponding engine cylinder is set at the HIGH level.

Though the output timing of the HIGH level fuel injection pulse slightly lags from the fuel injection terminating timing $it_2$ set in the 1 ms interrupt routine, because of the mechanical lag in the fuel injection valve 8 and the electromagnetic actuator 8a, the fuel injection valve 8 may be held open through the enrichment period as defined by the timing value $ASt_1$.

At a step 1309, the fuel injection timer value t is read. The fuel injection timer value t is compared with the $ASt_1$ value, at a step 1310. The steps 1309 and 1310 are repeated until the fuel injection timer value t becomes greater than or equal to the $ASt_1$ value. When the fuel injection timer value t is greater than or equal to $ASt_1$ value at the step 1310, the fuel injection pulse Si is set at the LOW level at a step 1311. Thereafter, the fuel resumption enrichment count value $n_{TN}$ is incremented by 1, at a step 1312.

On the other hand, when the fuel resumption enrichment count value $n_{TN}$ is greater than or equal to the enrichment cycle reference $n_{ref}$ as checked at the step 1305, process the goes to the step 1302.

When the fuel resuming enrichment indicative flag $F_{ACRE}$ is not set as checked at the step 1304, the process goes to a step 1313, in which the normal engine acceleration enrichment count value $n_{TR}$ is compared with the enrichment cycle reference value $n_{ref}$. When the normal engine acceleration enrichment count value $n_{TR}$ is smaller than the enrichment cycle reference value $n_{ref}$, the acceleration enrichment correction value is calculated at a step 1314.

Based on the acceleration enrichment correction value ta as derived at the step 1315, the fuel injection terminating timing $ASt_1$ which represents the timing of termination of the acceleration enrichment fuel injection, is derived at a step 1316. After setting the fuel injection terminating timing $ASt_1$, the fuel injection pulse Si for the corresponding engine cylinder is set at the HIGH level.

At a step 1317, the fuel injection timer value t is read. The fuel injection timer value t is compared with the $ASt_1$ value, at a step 1318. The steps 1317 and 1318 are repeated until the fuel injection timer value t becomes greater than or equal to the $ASt_1$ value. When the fuel injection timer value t is greater than or equal to the $ASt_1$ value at the step 1318, the fuel injection pulse Si is set at LOW level at a step 1319. Thereafter, the fuel resumption enrichment count value $n_{TR}$ is incremented by 1, at a step 1320.

On the other hand, when the fuel resumption enrichment count value $n_{TR}$ is greater than or equal to the enrichment cycle reference $n_{ref}$ as checked at the step 1313, the process goes to the step 1302.

Figure 7:
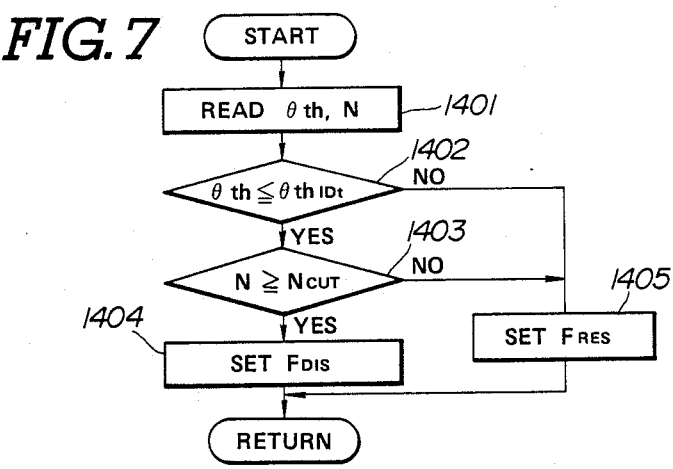
FIG. 7 is a flowchart of an interrupt routine to be cyclically executed for detecting a vehicular driving condition satisfying a predetermined fuel cut-off condition to perform fuel cut-off operation.

FIG. 7 shows an interrupt routine for detecting an engine driving condition satisfying a predetermined fuel cut-off condition. Fundamentally, the fuel cut-off is performed when the engine speed is higher than a predetermined fuel cut-off criterion which represents minimum engine speed to maintain the engine at the fuel cut-off state and when the throttle angular position is substantially at a fully closed position. Though various additional features may be taken to determine the fuel cut-off condition in the actual fuel cut-off control operation, the shown example simply takes the throttle valve angular position $\theta_{th}$ and the engine speed N as the fuel cut-off control parameters so as to simplify the disclosure. However, the shown example should be appreciated as a mere example for disclosing the preferred embodiment of the fuel injection control system according to the invention.

The interrupt routine of FIG. 7 may be triggered with a given regular intervals. Immediately after starting execution, the throttle angle indicative signal value $\theta_{th}$ and the engine speed data N are read out at a step 1401. The throttle angle indicative signal value $\theta_{th}$ is compared with a throttle closed position indicative reference value $\theta ref_{IDL}$, at a step 1402. The throttle closed position indicative reference value $\theta ref_{IDL}$ represents the throttle valve in the fully closed position or the throttle valve in the substantially closed position and thus represents an engine braking state.

If the throttle angle indicative signal value $\theta_{th}$ is smaller than the throttle closed position indicative reference value $\theta ref_{IDL}$, as checked at the step 1402, the engine speed N is compared with a preset fuel cut speed threshold $N_{ref}$ which is representative of the minimum engine speed to allow fuel cut-off at a step 1403. If the engine speed N is greater than or equal to the fuel cut speed threshold $N_{ref}$, the fuel cut indicative flag $F_{DIS}$ is set at a step 1404. After the step 1404, the process goes to the end to return the background job. On the other hand, when the throttle angle indicative signal value $\theta_{th}$ is greater than the throttle closed position indicative reference value $\theta ref_{IDL}$, the fuel cut indicative flag $F_{DIS}$ is checked at a step 1405. When the fuel cut indicative flag $F_{DIS}$ is not set as checked at the step 1405, the process directly goes to the end to return to the background job.

On the other hand, when the fuel cut indicative flag $F_{DIS}$ is set as checked at the step 1405, the fuel resumption indicative flag $F_{RES}$ is set at a step 1406. When the engine speed N as checked at the step 1403 is lower than the fuel cut speed threshold $N_{ref}$, the process also goes to the step 1406 for setting the fuel resumption indicative flag $F_{RES}$. After the process in the step 1406, the process returns to the background job.

The fuel cut indicative flag and the fuel resumption indicative flag thus set during execution of the interrupt routine of FIG. 7 will be utilized for distinguishing the engine condition between the fuel cut-off condition, the fuel resuming condition after fuel cut-off and the normal fuel injecting condition, during execution of the acceleration enrichment correction value ta derivation routine of FIG. 6, as set forth above.

FIGS. 8 and 9 show sub-routines to be triggered at the steps 1213 and 1223 of the fuel injection pulse width Ti derivation interrupt routine of FIG. 5. With reference to FIGS. 8 and 9, the process of derivation of the fuel injection pulse width Ti will be discussed.

The sub-routine of FIG. 8 is triggered for deriving a fuel injection pulse width of asynchroneous fuel injection during fuel resuming enrichment. Basically, the fuel injection pulse width Ti upon fuel resumption is derived from the basic fuel injection pulse width Tp, the acceleration enrichment correction value ta and the correction coefficient COEF, in the normal case. However, in the process of steps 1213 and 1223, since asynchronous fuel injection is to be performed to compensate for lack of a sufficient fuel amount in relation to an increase of the air flow rate in order to avoid too lean a mixture rate, the acceleration enrichment correction value ta per se as fuel injection pulse width Ti. In the shown embodiment, a basic acceleration enrichment correction value ta(T$\Delta\alpha$) is determined on the basis of the throttle angle variation indicative value $\Delta\alpha$. As shown in FIG. 10, the basic acceleration enrichment correction value ta(T$\Delta\alpha$) is variable in an essentially linear fashion and is substantially proportional to the throttle angle variation indicative value $\Delta\alpha$. The basic acceleration enrichment correction value ta(T$\Delta\alpha$) is modified by a correction coefficient $T_{Tw}$ derived on the basis of the engine coolant temperature indicative signal value Tw. The correction coefficient $T_{Tw}$ will be hereafter referred to as the "coolant temperature dependent correction coefficient". Further modification of the basic acceleration enrichment correction value ta(T$\Delta\alpha$) is performed by adding a given value $KQ_2$ whose value corresponds to a fuel amount sufficient for making the inner periphery of the intake manifold wet. This additional fuel amount is particularly necessary for acceleration enrichment immediately after fuel cut-off operation, since the inner periphery of the intake manifold becomes dry during a fuel cut-off period.

Therefore, in the process illustrated in FIG. 8, the basic acceleration enrichment correction value ta(T$\Delta\alpha$) is derived in terms of the throttle angle variation indicative value $\Delta\alpha$, at a step 1500. Derivation of the acceleration enrichment correction value ta(T$\Delta\alpha$) may be performed by table look-up against an acceleration enrichment correction value ta(T$\Delta\alpha$) table (hereafter ta(T$\Delta\alpha$) table) in terms of the throttle angle variation indicative value $\Delta\alpha$. In the alternative, a formula for deriving the acceleration enrichment correction value ta(T$\Delta\alpha$) in terms of the throttle angle variation indicative value $\Delta\alpha$ can be established through arithmetic operation.

At a step 1501, the coolant temperature dependent correction coefficient $T_{Tw}$ is determined on the basis of the engine coolant temperature sensor signal value Tw. At a step 1502, the given value $KQ_2$ is read out. On the basis of the acceleration enrichment correction value ta(T$\Delta\alpha$) derived at the step 1500, the coolant dependent correction coefficient $T_{Tw}$ derived at the step 1501 and the given value $KQ_2$ read at the step 1502, the acceleration enrichment correction value ta is determined at a step 1503.

After the process at step 1503, the process goes back to the interrupt routine of FIG. 5.

The sub-routine of FIG. 9 is designed to be triggered at the step 1218 of the 10 ms interrupt program for deriving the fuel injection pulse width Ti during normal engine condition. Since, in such a condition, fuel injection is cyclically and continuously performed for respective engine revolution cycles, the inner periphery of the intake manifold is held wet. Therefore, the modification of the acceleration enrichment correction value ta(T$\Delta\alpha$) utilizing the $KQ_2$ correction value which should be made in the process of the sub-routine of FIG. 8, becomes unnecessary. Other steps in the sub-routine of FIG. 9 are identical to that of the sub-routine of FIG. 8. Therefore, the detailed discussion of the process of the sub-routine of FIG. 9 will not be repeated to avoid redundant recitation corresponding steps in FIG. 9 are identified by the same reference numerals to that used in FIG. 8.

In the alternative, the acceleration enrichment correction value ta may be derived by modifying the acceleration enrichment correction value ta(T$\Delta\alpha$) with further additional correction factors. The acceleration enrichment correction value ta is derived according to the following equation:

$$ta = ta(T\Delta\alpha) \times T_{TW} \times TRTP \times TRN + KQ_2$$

where
TRTP is an engine load dependent correction value variable depending upon the basic fuel injection pulse duration indicative value Tp; and
TRN is an engine speed dependent correction value variable depending upon the engine speed N.

Even in this case, the $KQ_2$ value may not be used for acceleration enrichment under normal engine driving conditions.

Figure 11:
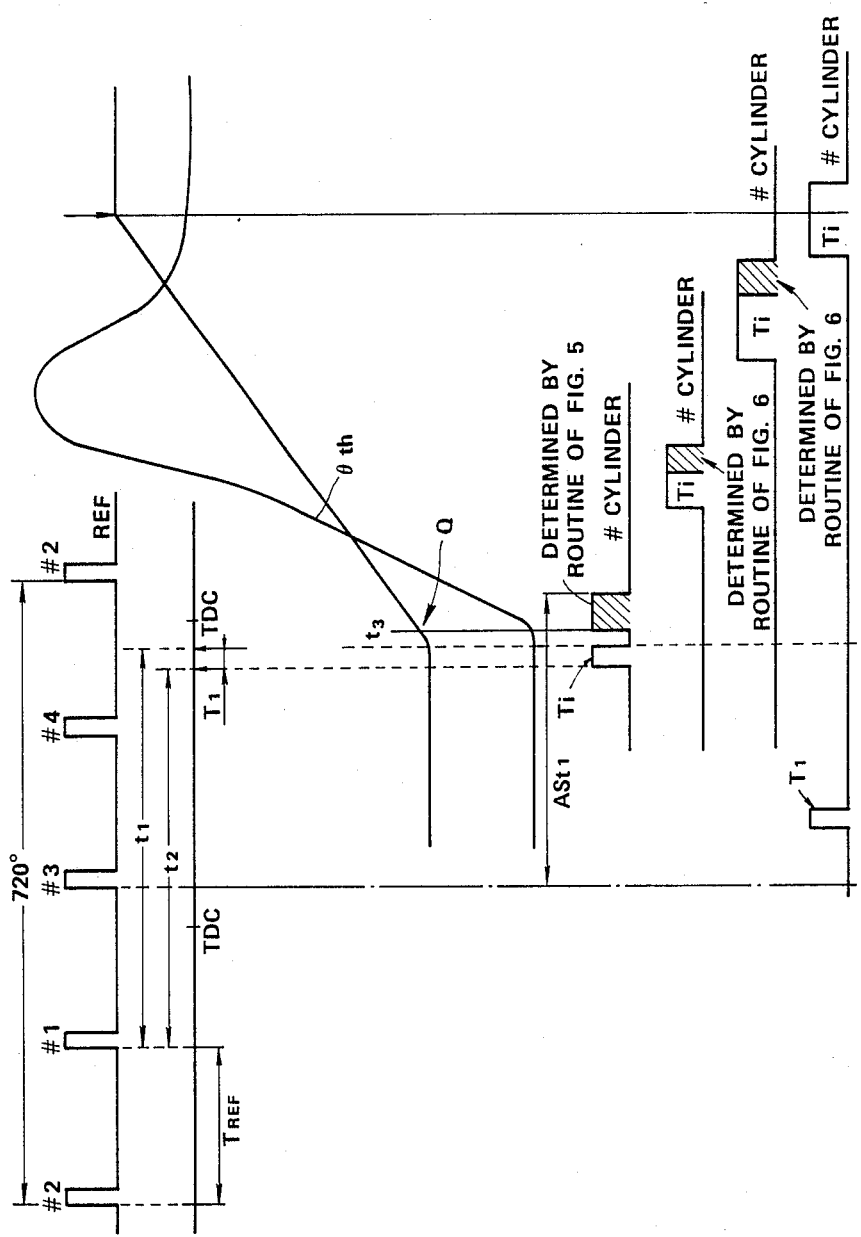
FIG. 11 is a timing chart showing operation of the preferred embodiment of the fuel injection control system of FIG. 1.

The practical fuel injection control operation to be performed by the aforementioned preferred embodiment of the fuel injection control system, will be discussed with reference to FIG. 11.

As set forth above, the shown embodiment of the fuel injection control system is for controlling fuel injection timing and fuel injection amount for a 4-cylinder engine which performs spark ignition in the order of No. 1 cylinder - No. 3 cylinder - No. 4 cylinder - No. 2 cylinder. In addition, the fuel injection timer 30 is designed to be reset in response to the crank reference signal $\theta_{ref}$ generated at 70° BTDC of No. 3 cylinder.

As is well known, the fuel injection is to be performed around induction TDC of the corresponding engine cylinder. Therefore, fuel injection timing for the No. 1 cylinder will be performed at about compression TDC of No. 4 cylinder. On the other hand, the intake valve is driven to open at the induction TDC to open the intake port for introducing the air/fuel mixture into the combustion chamber during a piston intake stroke which ends at BDC (bottom-dead-center) of the piston.

As set forth, according to the present invention, normal fuel injection is to be finished at induction TDC so as to finish the fuel injection before the intake valve starts to open. This causes collision of all amount of fuel injected for better atomization characteristics of the fuel. By obtaining good atomization characteristics, the mixture rate of the intake air and the injection fuel becomes substantially uniform. Such a uniform mixture ratio of the air/fuel mixture exhibits good flame propagation in the combustion chamber of the engine cylinder.

The timing where the No. 1 cylinder reaches the induction TDC is projected on the basis of the interval $T_{REF}$ of occurrence of the crank reference signals $\theta_{ref}$ respectively generated at 70° BTDC the compression stroke of No. 2 cylinder and No. 1 cylinder. This projected timing is set as the $1t_1$ value to define the fuel injection terminating timing. On the basis of determined fuel injection terminating timing $1t_1$ and the fuel injection pulse width Ti to be derived during execution of the 10 ms interrupt routine, the fuel injection start timing $1t_2$ is determined. Therefore, fuel injection for the No. 1 cylinder is performed during the period between the fuel injection start timing 2t₁ and the fuel injection terminating timing 1t₁.

Assuming the accelerator pedal is depressed at a timing t₃ after the fuel injection terminating timing 1t₁ for engine acceleration, intake air flow rate Q increases in response to an increase of open angle of the throttle valve. This change of engine load Q is detected in execution of the 10 ms interrupt routine of FIG. 5. Therefore, acceleration enrichment is ordered. The acceleration enrichment correction value ta is then determined through the step 1213 or 1223 of the 10 ms interrupt routine.

Therefore, as soon as the acceleration enrichment demand is detected, asynchroneous fuel injection is performed for a period variable basically depending upon the throttle angle variation rate $\Delta\alpha$.

Subsequently, fuel injection is performed for No. 3 cylinder. At the end of the fuel injection for the No. 3 cylinder, the interrupt routine of FIG. 6 is triggered in response to the trailing edge of the HIGH level fuel injection pulse. By executing the interrupt routine, the acceleration enrichment correction value ta is determined expanded for the period corresponding to the acceleration enrichment correction value. This additional period of fuel injection is performed through predetermined injection cycles.

By performing acceleration enrichment for several injection cycles, error in the air flow rate indicative signal in relation to the actual air flow rate due to a lag in response of the air flow meter can be compensated and provides good transition characteristics in acceleration enrichment.

In the asynchroneous fuel injection in response to the acceleration enrichment demand, it tends to occur that the fuel injection period extends after the intake valve close timing. In this case, the fuel injected after closure of the intake valve may stay in the intake manifold to be mixed to the induction air and the fuel injected at the next occurrence of the fuel injection. As a result, the air/mixture to be formed in the next combustion cycle becomes too rich (over-rich). This makes the spark plug wet or causes after burn.

In order to avoid such a defect, it would be preferable to limit the fuel injection period so that the fuel injection can be terminated before the intake valve closes.

Figure 14:
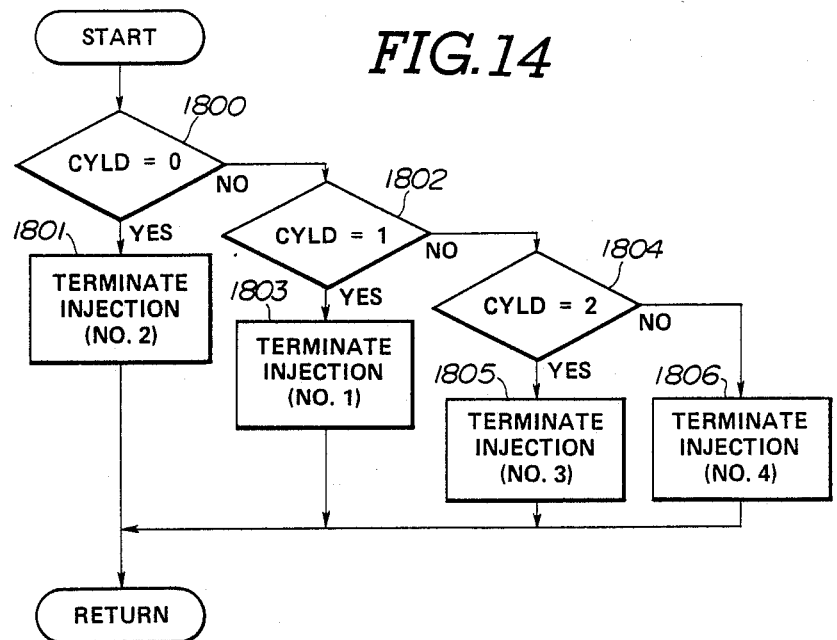
FIG. 14 is a flowchart of an interrupt routine to be triggered for asynchronous fuel injection inhibiting control.
Figure 15:
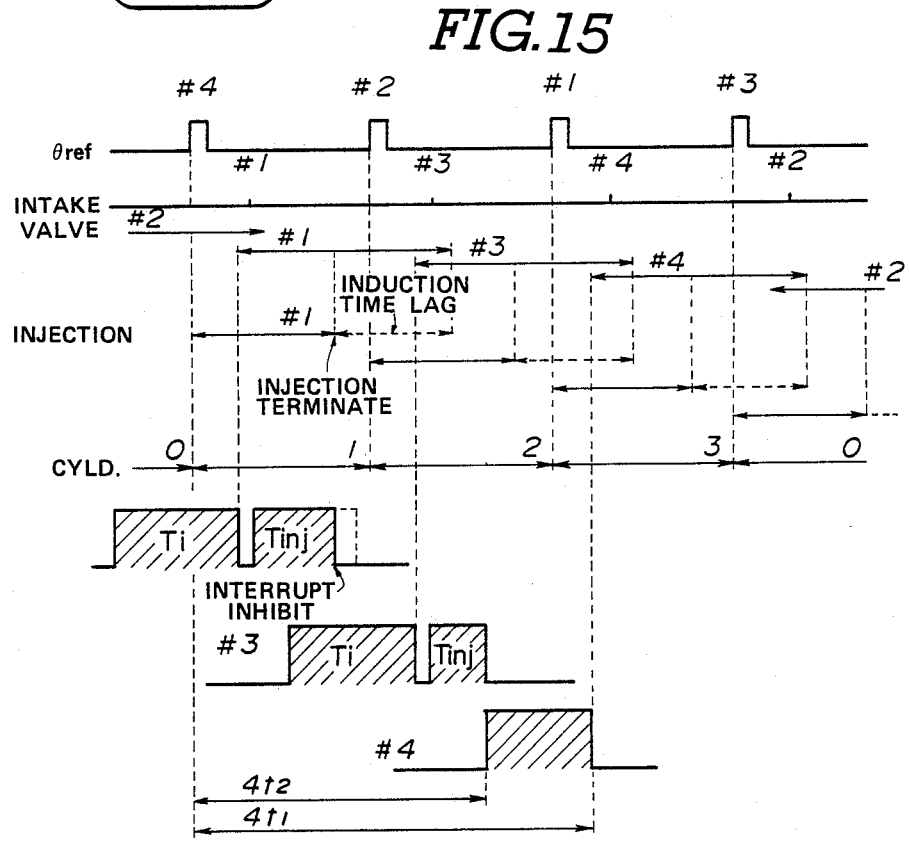
FIG. 15 is a timing chart showing asynchroneous fuel injection control to be performed by execution of the routine of FIG. 14.

FIGS. 12 through 14 show flowcharts of the process of limiting the fuel injection period. The routine of FIG. 12 is to be triggered in response to the crank reference signal $\theta_{ref}$ to discriminate the engine cylinder to perform fuel injection.

In execution of the routine of FIG. 12, a crank position signal $\theta_{pos}$ counter in the microprocessor 20 is reset at a step 1600. The crank position signal $\theta_{pos}$ counter CA counts up the crank position signal $\theta_{pos}$. At a step 1601, the pulse width of the crank reference signal $\theta_{ref}$ is compared with the specific crank reference signal $\theta_{ref3}$ to discriminate the engine cylinder number. When the crank reference signal pulse width is greater than or equal to the specific crank reference signal $\theta_{ref3}$, the cylinder indicative count CYLD is reset to zero at a step 1602. Therefore, the crank reference signal $\theta_{ref}$ as received is that generated at 70° BTDC of the No. 3 cylinder and thus indicates 70° BTDC approaching the induction TDC of the No. 2 cylinder.

On the other hand, when the pulse width of the received crank reference signal $\theta_{ref}$ is smaller than the specific crank reference signal pulse width $\theta_{ref3}$, the cylinder indicative count CYLD is incremented by 1.

Therefore, the relationship between the cylinder indicative count CYLD and the engine cylinder number becomes as follows:

| CLYD | Cy. No. ($0_{ref}$) | Cy. No. (Injection) |
|---|---|---|
| 0 | 3 | 2 |
| 1 | 4 | 1 |
| 2 | 2 | 3 |
| 3 | 1 | 4 |

The routine of FIG. 13 is designed for incrementing the crank position signal counter CA every occurrence of the crank position signal $\theta_{pos}$. Therefore, in response to the crank position signal $\theta_{pos}$, the crank position signal counter is incremented by 1 at a step 1701.

FIG. 14 is a routine to be executed every 180° for performing fuel injection terminating timing control. Namely, at step 1800, a check is performed to ascertain whether the cylinder indicative count CYLD is zero. If so, limitation of the fuel injection terminating timing 2t₁ for the No. 2 cylinder is set. In the process of limitation of the fuel injection terminating timing, the crank position signal counter CA is checked to detect the crank shaft angular position at which the intake valve closes. When the intake valve closing crank angle position is detected, the fuel injection pulse for injecting the fuel into the No. 2 cylinder is terminated at a step 1801.

When the cylinder indication count CYLD as checked is not zero, a check is performed to determine whether the count CYLD is one at a step 1802. If so, limitation for the fuel injection terminating timing for the No. 1 cylinder is performed at the step 1803 through the identical process as that performed in the step 1801. Similarly, when the cylinder indication count CYLD as checked is not one, a check is performed to determine whether the count CYLD is two at a step 1804. If so, limitation for the fuel injection terminating timing for the No. 3 cylinder is performed at the step 1805 through the identical process as that performed in the step 1801. On the other hand, when the cylinder indication count CYLD is not two as checked at the step 1804, limitation for the fuel injection terminating timing for the No. 4 cylinder is performed at the step 1806 through the identical process as that performed in the step 1801.

By limiting the fuel injection terminating timing an at the intake valve close timing, over-rich air/fuel mixture cannot be formed at any engine revolution cycle.

Therefore, the invention as illustrated in terms of the preferred embodiment fulfills all of the objects and advantages sought therefor.

Figure 16:
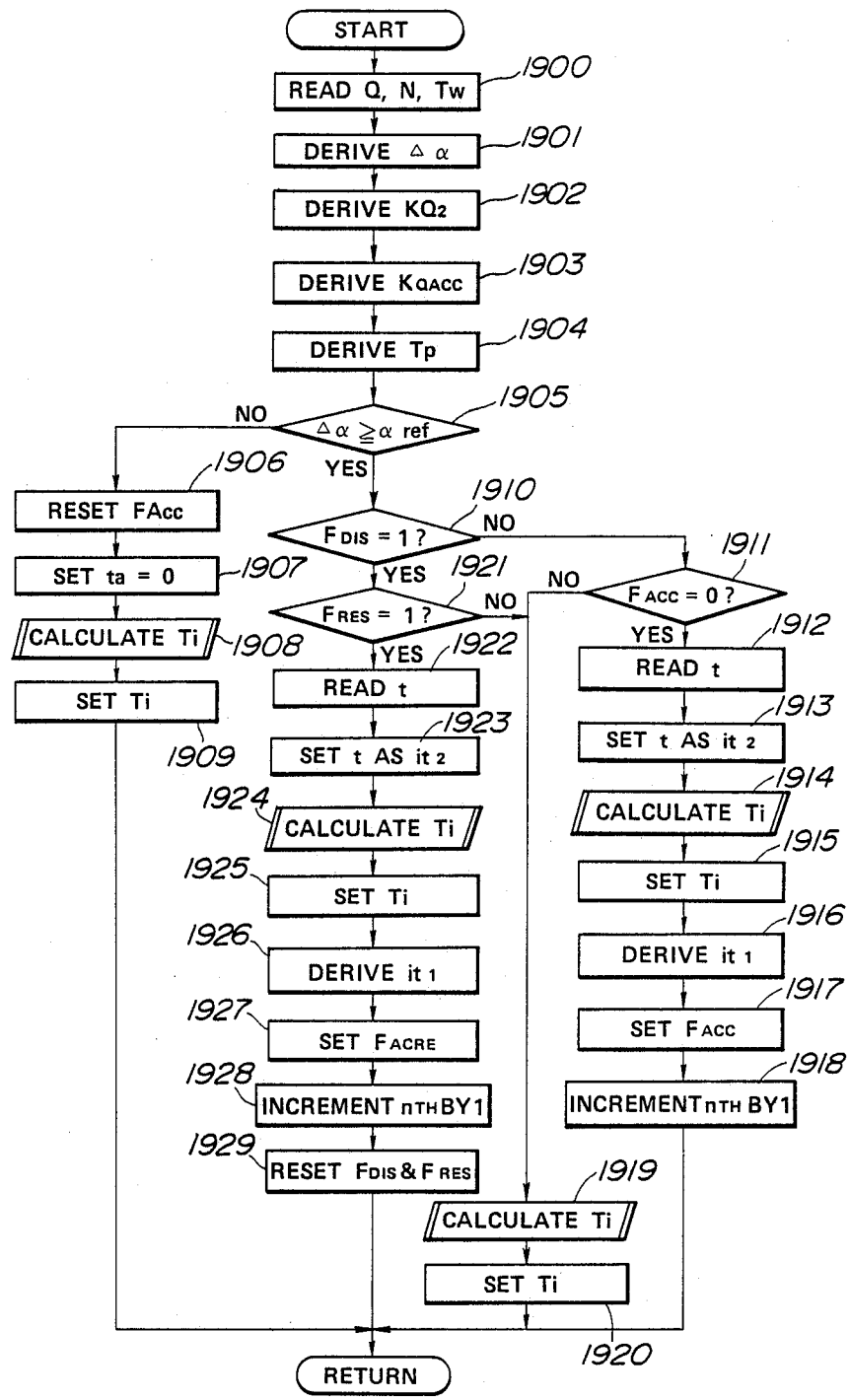
FIG. 16 is a flowchart of an interrupt routine which may be substituted for the interrupt routine of FIG. 5.

According to the present invention, an interrupt routine for determining the duration of fuel injection, illustrated in FIG. 16, may be substituted for the interrupt routine of FIG. 5. The interrupt routine of FIG. 16 is executed every 10 ms. Immediately after starting execution, the engine driving parameters, i.e. the engine speed N, the engine load Q and the engine coolant temperature Tw are read, at a step 1900. Then, the throttle angle indicative signal value $\theta_{th}$ is read and compared with the throttle angle indicative signal value $\theta_{th}$ which is read during the immediately preceding cycle of execution of the 10 ms interrupt routine, at a step 1901. As a result of comparison, the throttle angle variation indicative value $\Delta\alpha$ is obtained, at the step 1901. After the process in the step 1901, the load correction value KQ₂ is derived, at a step 1902.

Based on the load correction value $KQ_2$, a basic acceleration enrichment coefficient $K_{QACC}$ is derived, at a step 1903. The basic acceleration enrichment coefficient $K_{QACC}$ may be determined according to the following equation:

$$K_{QACC} = (K\Delta\alpha + K_N) \times KQ_2$$

where $K\Delta\alpha$ is a correction factor which is searched from a map on the basis of the throttle angle variation indicative value $\Delta\alpha$ and $K_N$ is a correction factor which is searched from the map on the basis of the engine speed N.

Based on the engine speed N, the engine load Q and the basic acceleration enrichment coefficient $K_{QACC}$, the basic fuel injection pulse width $T_P$ is derived, at a step 1904. The basic fuel injection pulse width $T_P$ may be determined according to the following equation:

$$T_P = K(Q + K_{QACC})/N \quad (K: constant)$$

The throttle angle variation indicative value $\Delta\alpha$ is compared with the predetermined throttle angular variation criterion $\alpha_{ref}$, at a step 1905. When the throttle angle variation indicative value $\Delta\alpha$ is smaller than the throttle angle variation criterion $\alpha_{ref}$, the acceleration enrichment demand indicative flag $F_{ACC}$ is reset (0) at a step 1906. After resetting the acceleration enrichment demand indicative flag $F_{ACC}$, the acceleration enrichment correction value ta is set to zero, at a step 1907. In conjunction with incorporating the acceleration enrichment correction value ta (=0), the HIGH level fuel injection pulse width is derived on the basis of the fuel injection control parameters, at a step 1908. In practice, the fuel injection pulse width Ti is calculated on the basis of the basic fuel injection value $T_P$ and fuel injection correction coefficient COEF. Derived fuel injection pulse width Ti is set in the Ti register 31, at a step 1909.

On the other hand, when the engine acceleration demand, i.e. the throttle angle variation indicative value $\Delta\alpha$ greater than or equal to the throttle angular variation criterion $\alpha_{ref}$, is detected, as checked at the step 1905, the process goes to a step 1910.

At the step 1910, the fuel cut indicative flag $F_{DIS}$ is checked. When the fuel cut indicative flag $F_{DIS}$ is reset (0) as checked at the step 1910, the process goes to a step 1911, in which the acceleration enrichment demand indicative flag $F_{ACC}$ is checked.

If the acceleration enrichment demand indicative flag $F_{ACC}$ is reset (0) as checked at the step 1911, a judgement is made that the current calculation cycle is for the first occurrence of the acceleration enrichment after occurrence of the acceleration enrichment demand. Then, the fuel injection timer value t is read at a step 1912 and is set as the fuel injection start timing $2t_1$ at a step 1913. In this case, at a step 1914, calculation of the fuel injection pulse width Ti is performed according to the process illustrated in FIG. 8. After deriving the fuel injection pulse width Ti at the step 1914, the derived fuel injection pulse width Ti is set in the Ti register 31, at a step 1915. At a step 1916, the fuel injection terminating timing $1t_1$ is derived on the basis of the set fuel injection pulse width Ti and the fuel injection start timing $2t_1$ as set at the step 1913. Thereafter, the acceleration enrichment demand indicative flag $F_{ACC}$ is set at a step 1917. At a step 1918, the normal engine acceleration enrichment count value $n_{TR}$ in RAM address 37 in RAM is incremented by 1.

When the acceleration enrichment demand indicative flag $F_{ACC}$ is set (1) as checked at the step 1911, calculation of the fuel injection pulse width Ti is performed on the basis of the $T_P$, ta and COEF. The enrichment correction value ta is read from a RAM address 38 as set during calculation of the fuel injection pulse width Ti in the step 1914 or a step 1919 which will be discussed later, at a step 1919. The fuel injection pulse width Ti as derived at the step 1919, is set in the Ti register 31, at a step 1920.

On the other hand, if the fuel cut indicative flag $F_{DIS}$ is set as checked at the step 1910, the fuel resumption indicative flag $F_{RES}$ is checked at a step 1921. At a step 1922, the fuel injection timer value t is read. The read fuel injection timer value t is set as the fuel injection start timing $2t_1$ at a step 1923. After the step 1923, calculation of the fuel injection pulse width Ti is performed at a step 1924. Derivation of the fuel injection pulse width Ti is performed according to the process illustrated in FIG. 9, at the step 1924. The derived fuel injection pulse width Ti is set in the Ti register 31, at a step 1925. After setting the fuel injection pulse width Ti derived at the step 1925, the fuel injection terminating timing $1t_1$ is derived on the basis of the fuel injection pulse width Ti set at the step 1925 and the fuel injection start timing $2t_1$ set at the step 1923, at a step 1926. A fuel resuming enrichment indicative flag $F_{ACRE}$ is set (1), at a step 1927.

At a step 1928, the fuel resumption enrichment count value $n_{TN}$ is incremented by 1. Thereafter, the fuel cut indicative flag $F_{DIS}$ and the fuel resumption indicative flag $F_{RES}$ are reset at a step 1929.

After the process at the step 1909, 1918, 1920 or 1929, the process returns to the background job.

By substituting the interrupt routine illustrated in FIG. 16 for that of FIG. 5, the fuel injection pulse width Ti for gradual acceleration enrichment in which the throttle angle variation indicative value $\Delta\alpha$ is smaller than the throttle angular variation criterion $\alpha_{ref}$, can be increased on the basis of the step 1904, since the basic acceleration enrichment coefficient $K_{QACC}$ which increases as the throttle angle variation indicative value $\Delta\alpha$ increases, is added to the engine load Q at the step 1904. In the case of rapid acceleration enrichment in which the throttle angle variation indicative value $\Delta\alpha$ is greater than or equal to the throttle angular variation criterion $\alpha_{ref}$, the fuel injection pulse width Ti can be increased on the basis of the step 1904 as well as the step 1914, 1919 or 1924.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention set out in the appended claims.

What is claimed is:

1. A fuel injection control system for a multi-cylinder internal combustion engine including at least first and second engine cylinders, said fuel injection control system comprising:

first and second fuel injection valves corresponding to said first and second engine cylinders, each being provided for injecting fuel into corresponding engine cylinders at respective independent timing;

a sensor means for monitoring fuel injection control parameters including an engine load and engine speed and for producing a fuel injection control parameter indicative sensor signal;

a detector means for detecting engine acceleration demand and for producing an acceleration demand indicative signal; and a control unit for deriving a fuel injection amount to be injected through said first and second fuel injection valves, for deriving fuel injection start timing and fuel injection terminating timing for each of said first and second fuel injection valves so that said fuel injection terminating timing is set at a beginning of an induction stroke of a corresponding cylinder, and for controlling said first and second fuel injection valves to perform fuel injection at controlled timing, said control unit being responsive to said acceleration demand indicative signal to derive a fuel injection amount for acceleration enrichment to perform fuel injection irrespective of an engine driving stroke for one of said first and second fuel injection valves, and to delay said fuel injection terminating timing for a given period for subsequent given fuel injection timings, said control unit discriminating gradual acceleration enrichment, in which an acceleration demand indicative signal value is smaller than a predetermined criterion, from rapid acceleration enrichment, in which the acceleration demand indicative signal value is greater than or equal to said predetermined criterion, to perform fuel injection for each of gradual and rapid acceleration enrichments.

2. A fuel injection control system as set forth in claim 1, wherein said detector means monitors a magnitude of said acceleration demand and varies a value of said acceleration demand indicative signal, and said control unit derives said fuel injection amount for acceleration enrichment on the basis of said acceleration demand indicative signal value.

3. A fuel injection control system as set forth in claim 2, wherein said control unit detects an engine driving condition satisfying a predetermined fuel cut-off condition on the basis of said sensor signal, for controlling said first and second fuel injection control valves to disable fuel injection, and is responsive to said acceleration demand indicative signal during a fuel cut-off state to modify said fuel injection amount for acceleration enrichment by adding a given value.

4. A fuel injection control system as set forth in claim 2, wherein said control unit modifies said fuel injection amount for acceleration enrichment on the basis of sensor signal values.

5. A fuel injection control system as set forth in claim 4, wherein said sensor means includes a sensor for monitoring engine temperature condition for producing an engine temperature condition indicative signal and said control unit derives a correction value for said fuel injection amount for acceleration enrichment on the basis of an engine temperature condition indicative signal value.

6. A fuel injection control system as set forth in claim 4, wherein said control unit derives a basic fuel injection amount on the basis of engine speed and engine load and modifies said fuel injection amount for acceleration enrichment on the basis of said basic fuel injection amount.

7. A fuel injection control system as set forth in claim 4, wherein said control unit modifies said fuel injection amount for acceleration enrichment on the basis of a sensor signal indicative of engine load.

8. A fuel injection control system as set forth in claim 4, wherein said control unit modifies said fuel injection amount for acceleration enrichment on the basis of a sensor signal indicative of engine speed.

9. A fuel injection control system as set forth in claim 1, wherein said sensor means includes a crank angle sensor for monitoring an engine crank shaft angular position for producing a crank reference signal at every predetermined crank shaft angular position, and said control unit measures intervals between occurrences of said crank reference signal for projecting a timing of a beginning of an induction stroke of each engine cylinder and determines said fuel injection start timing and said fuel injection terminating timing on the basis thereof.

10. A fuel injection control system as set forth in claim 1, wherein said control unit detects an end of an induction stroke of each cylinder, at which an intake valve closes, for terminating fuel injection for a corresponding engine cylinder.

11. A fuel injection control system for a multi-cylinder internal combustion engine including at least first and second engine cylinders connected to an induction system for introducing an air/fuel mixture through intake ports which are closed by first and second intake valves designed to be driven to open during an induction stroke of a corresponding engine cylinder, said fuel injection control system comprising:

a first fuel injection valve corresponding to said first engine cylinder for injecting fuel into said first engine cylinder;

a second fuel injection valve corresponding to said second engine cylinder for injecting fuel into said second engine cylinder;

a sensor means for monitoring fuel injection control parameters including an engine load and engine speed and for producing a fuel injection control parameter indicative sensor signal;

a detector means for detecting engine acceleration demand and for producing an acceleration demand indicative signal; and a control unit for deriving a fuel injection amount to be injected through said first and second fuel injection valves on the basis of said fuel injection control parameter indicative sensor signal, for deriving fuel injection start timing and fuel injection terminating timing for each of said first and second fuel injection valves so that fuel injection terminating timing of said first fuel injection valve is set at an open timing of said intake valve in an induction stroke of said first engine cylinder and said fuel injection terminating timing of said second fuel injection valve is set at an open timing of said intake valve in an induction stroke of said second engine cylinder and for controlling said first and second fuel injection valves to perform fuel injection at respective set timings, said control unit being responsive to said acceleration demand indicative signal to derive a fuel injection amount for acceleration enrichment to perform fuel injection irrespective of an engine driving stroke for one of said first and second fuel injection valves which corresponds to one of said first and second engine cylinders in an induction stroke, and to delay said fuel injection terminating timing across said intake valve open timing for a given period for subsequent occurrence of fuel injection for another of said first and second fuel injection valves, said control unit discriminating gradual acceleration enrichment, in which an acceleration demand indicative signal value is smaller than a predetermined criterion, from rapid acceleration enrichment, in which said predetermined acceleration demand indicative signal value is greater than or equal to said criterion, to perform fuel injection for each of gradual and rapid acceleration enrichments.

12. A fuel injection control system as set forth in claim 11, wherein said detector means is associated with said sensor means for monitoring variation of a magnitude of engine load to detect acceleration demand for said engine and varies a value of said acceleration demand indicative signal, and said control unit derives said fuel injection amount for acceleration enrichment on the basis of an acceleration demand indicative signal value.

13. A fuel injection control system as set forth in claim 12, wherein said sensor means includes a throttle angle sensor for monitoring throttle valve angular position to produce a throttle angle indicative signal, and said detector means receives said throttle angle indicative signal for monitoring variation of a value of said throttle angle indicative signal for deriving said acceleration demand indicative signal value.

14. A fuel injection control system as set forth in claim 12, wherein said control unit detects an engine driving condition satisfying a predetermined fuel cut-off condition on the basis of said sensor signal and controlling said first and second fuel injection control valves to disable fuel injection, and is responsive to said acceleration demand indicative signal during a fuel cut-off state or immediately after fuel resumption to modify said fuel injection amount for acceleration enrichment by adding a given value.

15. A fuel injection control system as set forth in claim 12, wherein said control unit modifies said fuel injection amount for acceleration enrichment based on basis of said sensor signal values.

16. A fuel injection control system as set forth in claim 14, wherein said control unit further modifies said fuel injection amount for acceleration enrichment on the basis of a magnitude of a preselected enrichment correction parameter indicated in said sensor signal.

17. A fuel injection control system as set forth in claim 15, wherein said sensor means includes a sensor for monitoring an engine temperature condition for producing an engine temperature condition indicative signal and said control unit derives a correction value for said fuel injection amount for acceleration enrichment on the basis of an engine temperature condition indicative signal value.

18. A fuel injection control system as set forth in claim 15, wherein said control unit derives a basic fuel injection amount on the basis of engine speed and engine load and modifies said fuel injection amount for acceleration enrichment on the basis of said basic fuel injection amount.

19. A fuel injection control system as set forth in claim 15, wherein said control unit modifies said fuel injection amount for acceleration enrichment on the basis of a sensor signal indicative of engine load.

20. A fuel injection control system as set forth in claim 15, wherein said control unit modifies said fuel injection amount for acceleration enrichment on the basis of a sensor signal indicative of engine speed.

21. A fuel injection control system as set forth in claim 11, wherein said sensor means includes a crank angle sensor for monitoring an engine crank shaft angular position for producing a crank reference signal at every predetermined crank shaft angular position, and said control unit measures intervals between occurrences of said crank reference signal for projecting a timing of a beginning of an induction stroke of each engine cylinder and determines said fuel injection start timing and said fuel injection terminating timing on the basis thereof.

22. A fuel injection control system as set forth in claim 11, wherein said control unit detects an end of an induction stroke of each cylinder, at which an intake valve closes, for terminating fuel injection for a corresponding engine cylinder.

23. A fuel injection control system for a multi-cylinder internal combustion engine including at least first and second engine cylinders connected to an induction system for introducing an air/fuel mixture through intake ports which are closed by first and second intake valves designed to be driven to open during an induction stroke of a corresponding engine cylinder, said fuel injection control system comprising:

a first fuel injection valve corresponding to said first engine cylinder for injecting fuel into said first engine cylinder;

a second fuel injection valve corresponding to said second engine cylinder for injecting fuel into said second engine cylinder;

a first sensor for monitoring an engine load and for producing an engine load indicative first sensor signal;

a second sensor for monitoring a crank shaft angular position and for producing a crank reference signal at predetermined angular positions of a crank shaft;

a first detector means for detecting an engine revolution speed and for producing an engine speed indicative first detector signal;

a second detector means for detecting engine acceleration demand and for producing an acceleration demand indicative second detector signal;

first means, active cyclically at a given first time interval, for deriving a fuel injection pulse width on the basis of a first sensor signal value and a first detector signal value;

second means, active in response to said crank reference signal, for identifying one of said first and second engine cylinders to perform fuel injection, and for setting a fuel injection start timing and a fuel injection terminating timing for one of said first and second fuel injection valves corresponding to an identified one of said first and second engine cylinders such that said fuel injection terminating timing is set at a timing at which an intake valve of said identified one of said first and second engine cylinders starts to open;

third means, active cyclically at a given second time interval which is shorter than said first time interval, for detecting a set fuel injection start timing and said fuel injection terminating timing to operate one of said first and second fuel injection valves;

fourth means for detecting engine acceleration demand and for producing an acceleration demand indicative signal and for detecting one of said first and second engine cylinders in an induction stroke, for operating one of said first and second fuel injection valves corresponding to a detected one of said first and second engine cylinders irrespective of set timings to perform acceleration enrichment injection;

fifth means, active at every fuel injection terminating timing, and responsive to said acceleration demand indicative signal, for delaying said fuel injection terminating timing for an additional period of fuel injection for acceleration enrichment; and sixth means, associated with said fifth means, for discriminating gradual acceleration enrichment, in which an acceleration demand indicative signal value is smaller than a predetermined criterion, from rapid acceleration enrichment, in which an acceleration demand indicative signal value is greater than or equal to said predetermined criterion, for delaying fuel injection terminating timing for an additional period of fuel injection for each of gradual and rapid acceleration enrichments.

24. A fuel injection control system as set forth in claim 23, which further comprises a seventh means, associated with said fifth means, for counting occurrence of an additional period of fuel injection for acceleration enrichment and for terminating fuel injection terminating a timing delaying operation when a counted value reaches a predetermined value.

25. A fuel injection control system as set forth in claim 24, wherein said fourth means detects a magnitude of acceleration demand for deriving a fuel injection pulse width for acceleration enrichment injection based on a detected acceleration demand magnitude.

26. A fuel injection control system as set forth in claim 25, wherein said fifth means detects a magnitude of acceleration demand for deriving said additional period for acceleration enrichment injection on the basis of a magnitude of acceleration demand.

27. A fuel injection control system as set forth in claim 25, wherein said first means detects an engine driving condition satisfying a predetermined fuel cut-off condition for performing fuel cut-off operation, and said fourth means detects acceleration demand during or immediately after fuel cut-off operation to modify said fuel injection pulse width.

28. A fuel injection control system as set forth in claim 27, wherein said fourth means modifies said fuel injection pulse width to increase for a given period corresponding to a predetermined amount of fuel.

29. A fuel injection control system as set forth in claim 26, wherein said first means detects an engine driving condition satisfying a predetermined fuel cut-off condition for performing fuel cut-off operation, and said fourth means detects acceleration demand during or immediately after fuel cut-off operation to modify a delay period.

30. A fuel injection control system as set forth in claim 29, wherein said fourth means modifies said delay period to increase for a given period corresponding to a predetermined amount of fuel.

31. A fuel injection control system as set forth in claim 25, which further comprises a third sensor means for monitoring a preselected fuel injection correction parameter to produce a fuel injection correcting parameter indicative third sensor signal, and said fourth means modifies said fuel injection pulse width for acceleration enrichment.

32. A fuel injection control system as set forth in claim 27, which further comprises a third sensor means for monitoring a preselected fuel injection correction parameter to produce a fuel injection correcting parameter indicative third sensor signal, and said fourth means modifies said delay period for acceleration enrichment.

* * * * *